(12) United States Patent
Talavera et al.

(10) Patent No.: US 11,262,749 B2
(45) Date of Patent: Mar. 1, 2022

(54) VEHICLE CONTROL SYSTEM

(71) Applicants: Garrick F. Talavera, Rolling Hills Estates, CA (US); Robert A. Garland, Jr., Dripping Springs, TX (US); Douglas M. DeVore, Sierra Madre, CA (US)

(72) Inventors: Garrick F. Talavera, Rolling Hills Estates, CA (US); Robert A. Garland, Jr., Dripping Springs, TX (US); Douglas M. DeVore, Sierra Madre, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 182 days.

(21) Appl. No.: 16/725,074

(22) Filed: Dec. 23, 2019

(65) Prior Publication Data

US 2021/0191392 A1    Jun. 24, 2021

(51) Int. Cl.
*G05D 1/00* (2006.01)
*G05D 1/10* (2006.01)

(52) U.S. Cl.
CPC ......... *G05D 1/0038* (2013.01); *G05D 1/0044* (2013.01); *G05D 1/101* (2013.01)

(58) Field of Classification Search
CPC ..... G05D 1/0038; G05D 1/0044; G05D 1/101
See application file for complete search history.

(56) References Cited

U.S. PATENT DOCUMENTS

| | | | | |
|---|---|---|---|---|
| 4,315,240 A | * | 2/1982 | Spooner | G02B 27/017 |
| | | | | 340/971 |
| 5,781,437 A | * | 7/1998 | Wiemer | G01C 21/3688 |
| | | | | 340/995.26 |

(Continued)

FOREIGN PATENT DOCUMENTS

| EP | 2228626 A2 | 9/2010 |
|---|---|---|
| EP | 2991057 A2 | 3/2016 |

OTHER PUBLICATIONS

International Search Report for Application No. PCT/US2020/053605 dated Jan. 18, 2021.

*Primary Examiner* — Nicholas Kiswanto
(74) *Attorney, Agent, or Firm* — Tarolli, Sundheim, Covell & Tummino LLP

(57) ABSTRACT

A vehicle control system includes at least one control inceptor to provide pilot control of an associated vehicle and a communications interface to process external entity SA data associated with an external entity that is received at a communications system associated with the associated vehicle. An SA video screen displays video data to a pilot of the associated vehicle. The video data includes pilot-perspective visual data corresponding to a real-time dynamic virtual representation of surroundings of the associated vehicle that simulates a real-world visual perspective of the pilot to the surroundings of the associated vehicle and is responsive to the pilot control. A visual indicator of the external entity is superimposed onto the pilot-perspective visual data at an approximate location corresponding to an actual location of the external entity relative to the associated vehicle and beyond a visual range of the pilot based on the external entity SA data.

31 Claims, 12 Drawing Sheets

(56) References Cited

U.S. PATENT DOCUMENTS

| | | | |
|---|---|---|---|
| 7,486,291 B2 * | 2/2009 | Berson | G01C 23/00 |
| | | | 340/980 |
| 7,777,718 B2 * | 8/2010 | Franko | G09G 3/001 |
| | | | 345/156 |
| 8,820,678 B2 | 9/2014 | Devaul et al. | |
| 9,244,280 B1 * | 1/2016 | Tiana | G02B 27/01 |
| 9,302,780 B2 | 4/2016 | Zaneboni et al. | |
| 9,366,546 B2 * | 6/2016 | Colby | G08G 5/0086 |
| D768,052 S | 10/2016 | Kneuper et al. | |
| 9,672,745 B2 | 6/2017 | Kneuper et al. | |
| 9,772,712 B2 | 9/2017 | Kneuper et al. | |
| 10,005,562 B2 | 6/2018 | Kneuper | |
| 10,042,456 B2 | 8/2018 | Kneuper et al. | |
| 10,096,166 B2 | 10/2018 | Wright et al. | |
| 2005/0230563 A1 * | 10/2005 | Corcoran, III | B64C 13/18 |
| | | | 244/175 |
| 2006/0179338 A1 | 8/2006 | Sumner | |
| 2008/0158256 A1 | 7/2008 | Russell et al. | |
| 2009/0326735 A1 * | 12/2009 | Wood | G05D 1/0088 |
| | | | 701/2 |
| 2014/0014770 A1 | 1/2014 | Teller et al. | |
| 2014/0175222 A1 | 6/2014 | Zaneboni et al. | |
| 2014/0319270 A1 | 10/2014 | Devaul et al. | |
| 2016/0179327 A1 * | 6/2016 | Zammit-Mangion | |
| | | | G08G 5/0039 |
| | | | 701/7 |
| 2016/0272340 A1 | 9/2016 | Leland | |
| 2017/0113799 A1 | 4/2017 | Kovac et al. | |
| 2017/0200305 A1 | 7/2017 | Oddo et al. | |
| 2017/0243567 A1 | 8/2017 | Fung et al. | |
| 2018/0232097 A1 | 8/2018 | Kneuper et al. | |
| 2018/0284811 A1 | 10/2018 | Alliss et al. | |
| 2019/0094041 A1 * | 3/2019 | Casia | G01C 23/005 |
| 2019/0130783 A1 * | 5/2019 | Nissen | G09B 9/24 |

* cited by examiner

VEHICLE CONTROL SYSTEM

TECHNICAL FIELD

The present disclosure relates generally to vehicle controls, and specifically to a vehicle control system.

BACKGROUND

Vehicles are typically operated based on use of eyesight to provide adequate stimulus to the pilot to provide sufficient decision-making and proper reactionary control. Therefore, hand-eye coordination has long been a requirement of successfully navigating a vehicle, particularly when quick reaction speed is required for piloting the vehicle (e.g., in a combat situation). As a result, many techniques have been developed and continue to be developed to counteract the vision of a pilot as a primary means of navigating a vehicle. For example, since the dawn of aviation, pilots have used the glare of sunlight or cloud cover as a way of concealing themselves from enemy aircraft. Furthermore, as technology increases in complexity and ability, long-range stand-off distances become increasingly important as the stealth technology improves and the range of ordnance increases. Such factors have diminished the effectiveness of a pilot's natural eyesight to compete in modern warfare tactics.

SUMMARY

A vehicle control system includes at least one control inceptor to provide pilot control of an associated vehicle and a communications interface to process external entity situational awareness (SA) data associated with an external entity that is received at a communications system associated with the associated vehicle. The system further includes an SA video screen to display video data to a pilot of the associated vehicle. The video data includes pilot-perspective visual data corresponding to a real-time dynamic virtual representation of surroundings of the associated vehicle that simulates a real-world visual perspective of the pilot to the surroundings of the associated vehicle and is responsive to the pilot control. A visual indicator of the external entity is superimposed onto the pilot-perspective visual data at an approximate location corresponding to an actual location of the external entity relative to the associated vehicle and beyond a visual range of the pilot based on the external entity SA data.

Another example includes a method for controlling a vehicle via a vehicle control system. The method includes generating local SA data associated with the vehicle and receiving external entity SA data associated with an external entity via a communications system associated with the associated vehicle. The method also includes receiving global terrain data associated with a theater of operation of the vehicle and displaying video data to a pilot of the vehicle via a SA video screen. The video data includes pilot-perspective visual data corresponding to a real-time dynamic virtual representation of surroundings of the associated vehicle that simulates a real-world visual perspective of the pilot to the surroundings of the associated vehicle based on at least one of the global terrain data and exterior visual data provided from at least one local situational awareness sensor mounted to the vehicle. The method also includes displaying a visual indicator on the SA video screen of the external entity superimposed onto the pilot-perspective visual data at an approximate location corresponding to an actual location of the external entity relative to the associated vehicle and beyond a visual range of the pilot based on the external entity SA data. The method further includes controlling operation of the vehicle in response to pilot control inputs provided via at least one control inceptor and changing the pilot-perspective visual data in response to the operation of the vehicle to maintain the real-world visual perspective of the pilot to the surroundings of the associated vehicle.

Another example includes a system. The system includes a first vehicle comprising a control station configured to transmit theater of operation SA data and a second vehicle configured to transmit first situational awareness SA data associated with the second vehicle to the control station and to receive the theater of operational SA data. The system also includes a third vehicle comprising a vehicle control system. The vehicle control system includes at least one control inceptor configured to provide pilot control of the third vehicle, a communications interface configured to receive and process the theater of operation SA data, and an SA video screen configured to display video data to a pilot of the third vehicle. The video data includes pilot-perspective visual data corresponding to a real-time dynamic virtual representation of surroundings of the third vehicle that simulates a real-world visual perspective of the pilot to the surroundings of the third vehicle and is responsive to the pilot control. The video data further includes a visual indicator of each of the first vehicle and the second vehicle superimposed onto the pilot-perspective visual data at an approximate location corresponding to an actual locations of the first vehicle and the second vehicle, respectively, relative to the third vehicle and beyond a visual range of the pilot based on the theater of operation SA data.

DETAILED DESCRIPTION

Figure 1:
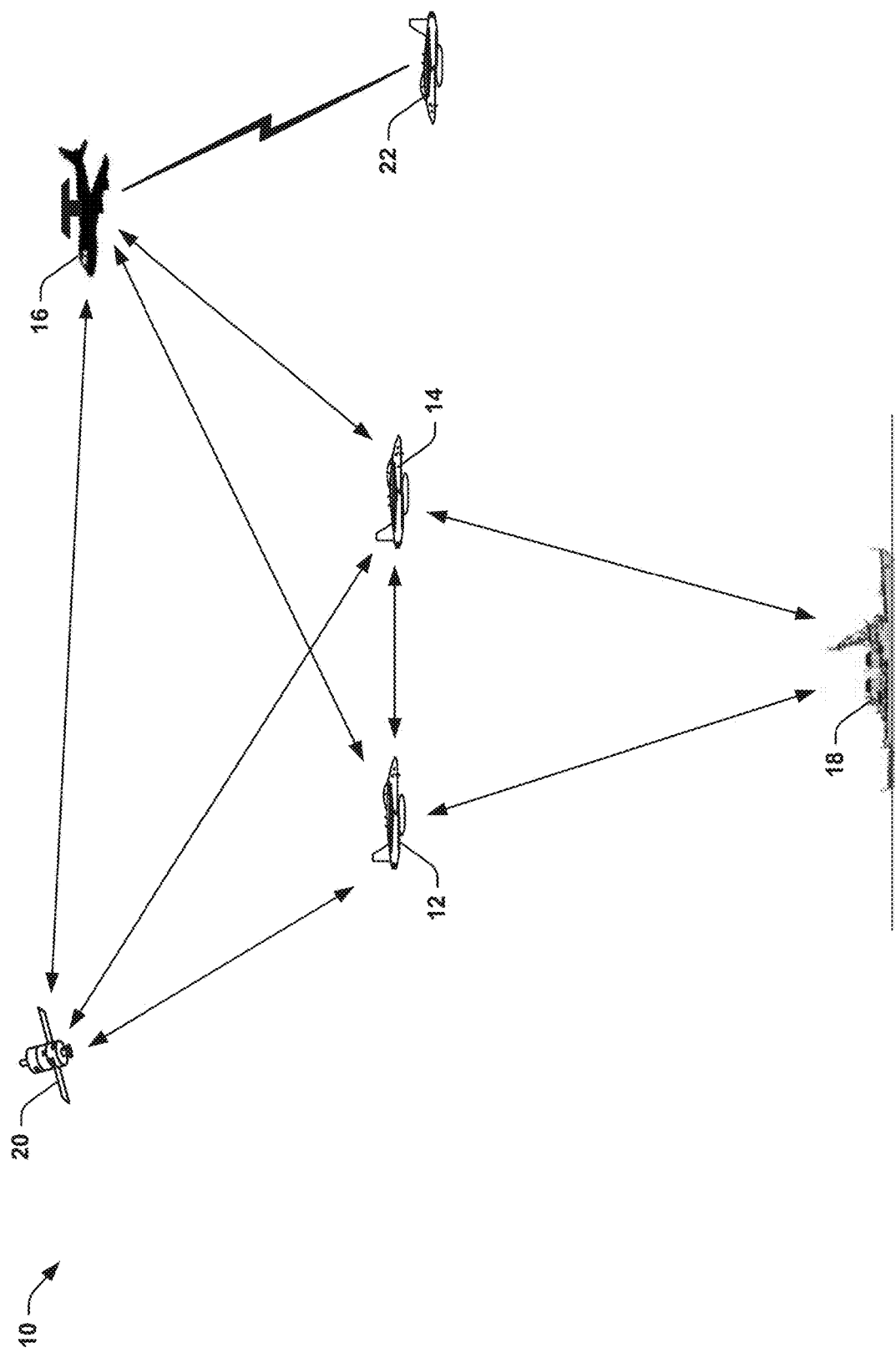
FIG. 1 illustrates an example diagram of a theater of operation.

The present disclosure relates generally to vehicle controls, and specifically to a vehicle control system. The vehicle control system can be implemented in any of a variety of vehicles to allow a pilot to operate a vehicle with enhanced situational awareness (SA) that may not require direct line-of-sight to the environment external to the vehicle. As an example, the vehicle can be any type of manned or unmanned vehicle, such as a ground vehicle, an aquatic vehicle, a submarine vehicle, an aircraft, or a spacecraft. The vehicle control system can be incorporated within a windowless vehicle cockpit, such that the pilot of the vehicle can operate the vehicle without any line-of-sight outside of the cockpit.

The vehicle control system can include one or more control inceptors that are configured to provide operational control of the vehicle in response to control inputs provided from the pilot. For example, the control inceptor(s) can include at least one touchscreen that can facilitate pilot inputs and/or display visual content. As an example, a first inceptor can be configured to display map data of the theater of operation in which the vehicle operates, and/or can allow interaction with visual data, and one or more second inceptors can be configured to facilitate pilot inputs for operating the vehicle (e.g., operating control components, ordnance, etc.). In addition, the vehicle control system includes a situational awareness (SA) video screen that displays video data to the pilot. The video data can include pilot-perspective visual data corresponding to a real-time dynamic virtual representation of surroundings of the vehicle that can simulate a real-world visual perspective of the pilot to the surroundings of the vehicle and can be responsive to the pilot control.

The SA video screen can be non-planar, such as to simulate actual perspective view for the pilot. As a result, the surroundings displayed on port and starboard sides of the vehicle can correspond to actual surroundings to the left and right of the vehicle, respectively. For example, because the cockpit that includes the vehicle control station can be windowless, the SA video screen can display rendered-video content that can be generated based on geographic map data (e.g., provided from a geographic mapping software and/or Digital Terrain Elevation Data (DTED)) and/or vision sensors mounted to the vehicle. As a result, the vision of the pilot of the surroundings of the vehicle can be unaffected by vision-obscuring factors, such as sunlight glare, night-time piloting, weather features (e.g., clouds), adversarial blinding (e.g., lasers), or any of a variety of other conditions that can directly impact the vision of the pilot. Additionally, as described herein, the SA video screen can provide enhanced SA data to the pilot that can extend beyond the vision or range of vision of the pilot.

As an example, the vehicle control system can also include a communication interface that can process external entity SA data. The external entity can correspond to an allied vehicle or an adversarial vehicle that is also operating in the theater of operation. The external entity SA data can be transmitted from, for example, another allied external entity (e.g., which may or may not be the allied external entity that is the subject of the external entity SA data). The SA video screen can thus display an indicator of the external entity that is superimposed on the pilot-perspective data at an approximate location of the external entity relative to the vehicle in actual three-dimensional space in the theater of operation. As another example, the indicator of the external entity can be an icon representing the external entity, despite the external entity being farther away from the vehicle than can be seen with unaided vision of the pilot. For example, an aircraft that is hundreds of miles away from the aircraft, while being too far away to be seen by the naked eyes of a pilot, can be displayed by the associated icon at an approximate location relative to the vehicle on the SA video screen. As a result, the pilot does not need to perform canopy mapping or any other sort of correlation of a location of the external entity on a satellite-view map to a location of the external entity relative to the heading and/or elevation of the vehicle.

FIG. 1 illustrates an example diagram 10 of a theater of operation. The diagram 10 demonstrates the theater of operation as including a number of entities within some form of communication with each other. As described herein, an "entity" is defined as a vehicle, person, building, or other facility that is actively involved in communications and/or is pertinent to the operation of the other entities in the theater of operation. In the example of FIG. 1, the diagram 10 includes a first vehicle 12 demonstrated as a first aircraft, a second vehicle 14 demonstrated as a second aircraft, a third vehicle 16 demonstrated as a third aircraft, a fourth vehicle 18 demonstrated as a nautical vehicle, a fifth vehicle 20 demonstrated as a spacecraft, and a sixth vehicle 22 demonstrated as a fourth aircraft. As described in greater detail herein, at least the first vehicle 12 can include a vehicle control system that can provide enhanced situational awareness (SA) to the respective pilot.

In the example of FIG. 1, the first vehicle 12, the second vehicle 14, the third vehicle 16, the fourth vehicle 18, and the fifth vehicle 20 can be in communication with each other, as demonstrated by the directional lines that interconnect each other. For example, the first and second vehicles 12 and 14 can be allied fighter jets flying a mission, the third vehicle 16 can be a supporting aircraft and the fourth vehicle 18 can be a supporting ship (e.g., aircraft carrier). Therefore, each of the third and fourth vehicles 16 and 18 can include a multitude of sensors and/or communications equipment to provide battle command over the theater of operation with respect to the first and second vehicles 12 and 14. The fifth vehicle 20 can be a satellite that provides global navigation satellite system (GNSS) data, communications, and/or intelligence information to each of the first, second, and third vehicles 12, 14, and 16.

For example, each of the vehicles 12, 14, 16, 18, and 20 can be configured to generate SA data associated with the respective one of the vehicles 12, 14, 16, 18, and 20. Therefore, the SA data can be shared among the vehicles 12, 14, 16, 18, and 20. For example, the first and second vehicles 12 and 14 can transmit the respective SA data to one or both of the third and fourth vehicles 16 and 18, which can in turn transmit the collective SA data to the first and second vehicles 12 and 14 (e.g., along with the SA data associated with the respective vehicles 16 and 18). Additionally or alternatively, the first and second vehicles 12 and 14 can transmit the respective SA data to each other. Additionally, in the example of FIG. 1, the sixth vehicle 22 can correspond to an adversarial aircraft that is detected by one of the vehicles 12, 14, 16, 18, and/or 20 (e.g., demonstrated as by the third vehicle 16) via sensors. For example, the SA data associated with the sixth vehicle 22 can correspond to location, velocity, bearing, altitude, and/or type of vehicle (and by extension, details about the type of vehicle) of the sixth vehicle 22. Therefore, the SA data associated with the sixth vehicle 22 can be shared among the vehicles 12, 14, 16, 18, and 20.

As described previously, at least the first vehicle 12 can include a vehicle control system that provides enhanced SA data to the pilot based on the SA data that is transmitted to it from and/or regarding the other vehicles 14, 16, 18, 20, and/or 22. The vehicle control system can facilitate allowing the pilot to see information regarding the other vehicles 14, 16, 18, 20, and/or 22 that are not capable of being seen with the naked eye in existing vehicle control systems, absent cumbersome and time-consuming canopy mapping and/or audial communication. Such enhanced SA data can therefore enable the pilot to make decisions in a faster and more efficient manner, and can therefore facilitate a more effective piloting of the first vehicle 12.

Figure 2:
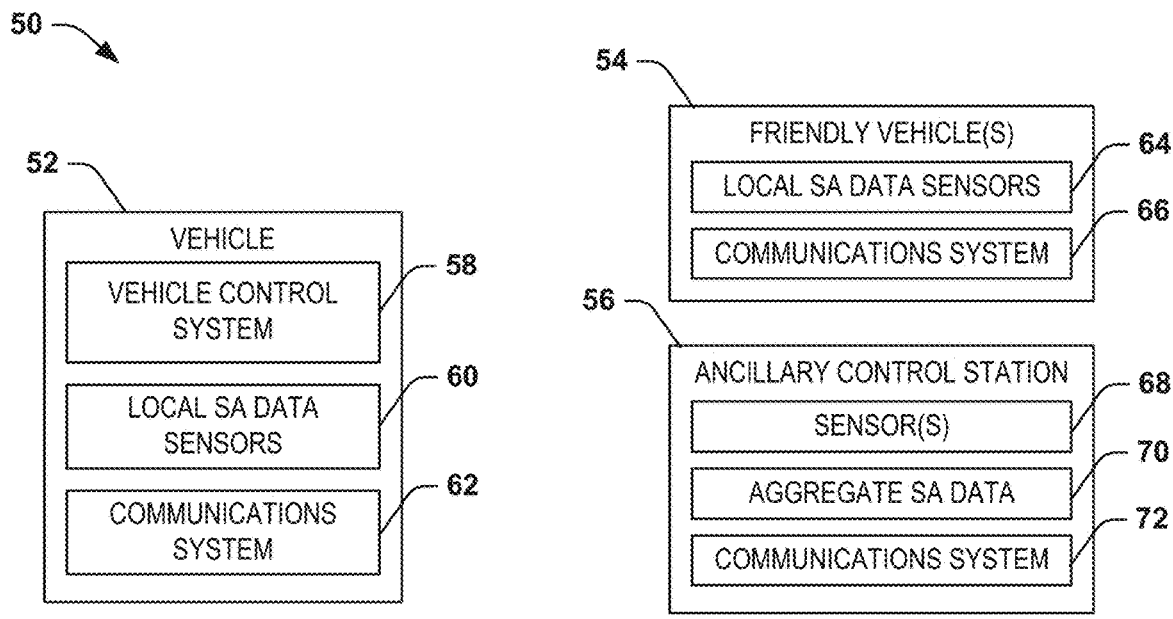
FIG. 2 illustrates an example diagram of the theater of operation.

FIG. 2 illustrates an example diagram 50 of the theater of operation. The diagram 50 is demonstrated as a block diagram of some of the vehicles of the theater of operation demonstrated in the example of FIG. 1. The diagram 50 includes a vehicle 52, at least one friendly vehicle 54, and an ancillary control station 56. As an example, the first vehicle 52 can correspond to the first vehicle 12, the friendly vehicle(s) 54 can correspond to at least the second vehicle 14, and the ancillary control station 56 can correspond to a control station associated with at least one of the third and fourth vehicles 16 and 18. Therefore, reference is to be made to the example of FIG. 1 in the following description of the example of FIG. 2.

The vehicle 52 includes a vehicle control system 58, local SA data sensors 60, and a communications system 62. As described in greater detail herein, the vehicle control system 58 can provide enhanced SA data to the pilot based on the SA data that is transmitted to the vehicle 52 (e.g., received at the communications system 62) from and/or regarding the other vehicles (e.g., including the friendly vehicle(s) 54). The local SA data sensors 60 can be configured to generate SA data associated with the vehicle 52, such that the SA data associated with the vehicle 52 can be implemented by the vehicle control system 58 to assist with providing the pilot-controls to the vehicle. Additionally, the SA data associated with the vehicle 52 can be transmitted from the vehicle 52 via the communications system 62, such as to the friendly vehicle(s) 54 and/or the ancillary control station 56.

The friendly vehicle(s) 54 each include local SA data sensors 64 and a communications system 66. The local SA data sensors 64 can operate substantially the same as the local SA data sensors 60 to generate SA data associated with the respective one of the friendly vehicle(s) 54. The SA data associated with the friendly vehicle(s) 54 is transmitted to the vehicle 52 and/or the ancillary control station 56 via the respective communications system 66. For example, the ancillary control station 56 can be included in one or more of the friendly vehicle(s) 54. As an example, one or more of the friendly vehicle(s) 54 can likewise also include a vehicle control system, such as similar to the vehicle control system 58 described in greater detail herein.

As an example, the SA data generated by the local SA data sensors 60 and 64 of each of the vehicle 52 and the friendly vehicle(s) 54, respectively, can include a large variety of status information regarding the vehicle 52 and the respective friendly vehicle(s) 54. For example, the SA data can include location, such as based on GNSS data (e.g., based on the fifth vehicle 20 in the example of FIG. 1). The SA data can also include navigation information, such as obtained from an inertial navigation system (INS), which can include altitude, velocity, bearing, and/or a projected flight path. The SA data can also include details regarding status conditions of the vehicle 52 and/or the friendly vehicle(s) 54, such as remaining fuel, ordnance, damage, or any other types of information regarding a current state of the vehicle 52 and/or the friendly vehicle(s) 54. Accordingly, the SA data can include a large variety of information that can assist the pilots In the example of FIG. 2, the ancillary control system 56 includes at least one set of sensors 68, aggregate SA data 70, and a communications system 72. The sensor(s) 68 can be configured to obtain information regarding the theater of operation, such as including the location and associated other data associated with adversarial vehicles (e.g., the sixth vehicle 22 in the example of FIG. 1) in the theater of operation. The aggregate SA data 70 can correspond to an aggregation of the SA data associated with each of the vehicle 52 and the friendly vehicle(s) 54, as well as any adversarial vehicles in the theater of operation. For example, the ancillary control station 56 can receive the local SA data from each of the vehicle 52 and the friendly vehicle(s) 54 via the communications system 72, as well as any additional data received via the sensor(s) 68 and can combine the SA data to generate the aggregate SA data 70. As another example, the aggregate SA data 70 can include geographic map data of the theater of operation, and can further include associated other information regarding the theater of operation, such as weather conditions, locations of weather features (e.g., clouds), and/or any other type of information regarding the theater of operation that may be deemed relevant for controlling the vehicle 52 in the theater of operation. For example, the aggregate SA data 70 can be arranged as raw data to be processed at the vehicle 52 to which it is transmitted, or can be pre-processed at the ancillary control station 56 before being transmitted to the vehicle 52. The ancillary control station 56 can thus transmit the aggregate SA data 70 from the communications system 72 to the communications system 62 of the vehicle 52 (e.g., and the communications system 66 of each of the friendly vehicle(s) 54) to facilitate control of the vehicle 52 via the vehicle control system 58 based on the aggregate SA data 70, as described in greater detail herein.

Figure 3:
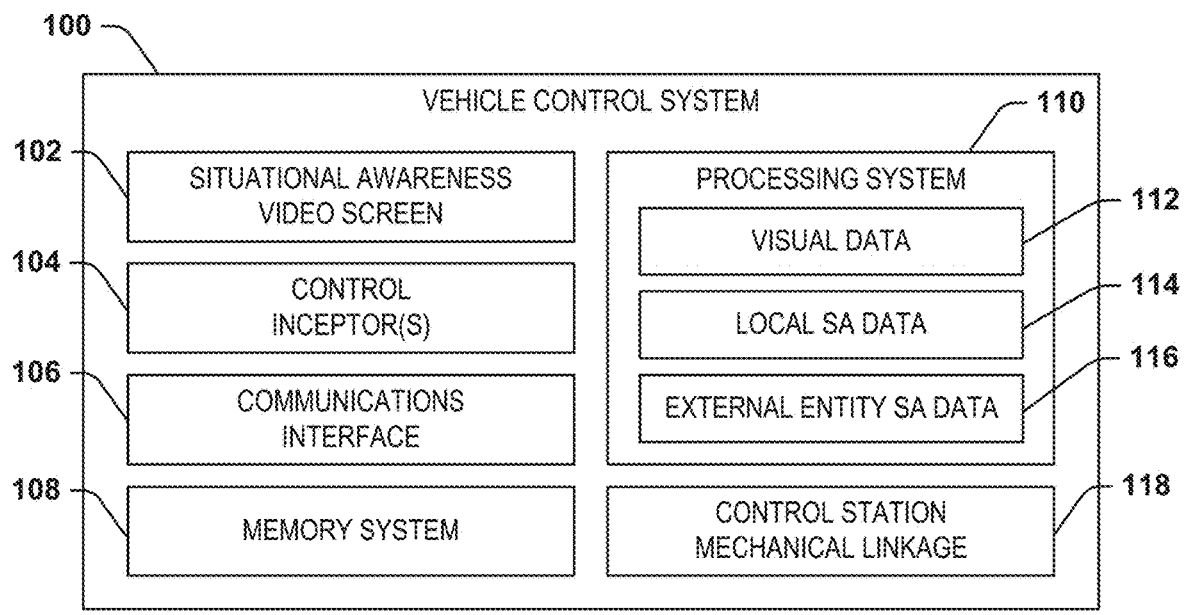
FIG. 3 illustrates an example diagram of a vehicle control system.

FIG. 3 illustrates an example diagram of a vehicle control system 100. The vehicle control system 100 can be included in at least the first vehicle 12 in the example of FIG. 1, and can correspond to the vehicle control system 58 in the example of FIG. 2. Therefore, reference is to be made to the examples of FIGS. 1 and 2 in the following description of the example of FIG. 3. Additionally, while the examples herein are directed primarily to the vehicle control system 100 being implemented in a vehicle configured as an aircraft, it is to be understood that the vehicle can instead be any of a variety of other types of vehicles, such as marine vehicles, submarine vehicles, terrestrial vehicles, and spacecraft.

The vehicle control system 100 includes an SA video screen 102, at least one control inceptor 104, a communications interface 106, a memory system 108, and a processing system 110. The SA video screen 102 is configured to display video data to the pilot. The video data includes pilot-perspective visual data corresponding to a real-time dynamic virtual representation of surroundings of the associated vehicle that simulates a real-world visual perspective of the pilot to the surroundings of the vehicle. The surroundings can include physical objects (e.g., other vehicles, land-features, buildings, etc.), and can also include weather features (e.g., clouds, rain, etc.). As an example, the vehicle control system can be incorporated in a windowless enclosed cockpit. As a result, the video data can replace the perspective view of the pilot of the surroundings that the pilot would normally experience by looking out of the cockpit windows, such that the video data simulates the perspective view of the pilot of the surroundings in a graphically-rendered manner.

Based on the display of the pilot-perspective visual data on the SA video screen 102, the pilot can control the vehicle in substantially the same manner as a pilot would control a similar vehicle using actual visual eyesight of the actual surroundings through a window. However, instead of using naked eye contact or augmented reality contact (e.g., via a helmet mounted display) with the actual surroundings, by using the SA video screen 102 of the vehicle control system 100, such as in an enclosed windowless cockpit, the pilot can see graphically modified images of the surroundings in a manner that can assist the pilot with additional SA data (as described in greater detail herein), and in a manner that can better protect the pilot. For example, because the pilot is not exposing his or her eyes to the actual surroundings, the pilot can be protected from potentially dangerous or damaging visual effects. As an example, the pilot can be immune from the potential dangerous conditions caused by glare from the Sun given that the Sun need not be graphically rendered into the pilot-perspective visual data or can be rendered in a manner that is not dangerous for the pilot to behold. Additionally, the pilot can be unaffected by laser countermeasures provided from adversarial vehicles or other sources that can damage the pilot's vision. As another example, because the pilot-perspective data is graphically rendered, the graphical rendering can be agnostic of or regardless of time of day to allow the pilot to fly in any simulated weather or time-of-day conditions. For example, the graphical rendering can provide the pilot with a "permanent daylight" operating condition to mitigate the difficulties that may be associated with operating the vehicle at night or in vision-obscuring conditions, such as heavy clouds, smoke, or other effects that can partially or completely blind a pilot.

As an example, the pilot-perspective visual data can be rendered on the SA video screen 102 based on at least one of geographic map data and image data obtained from sensors that are coupled to the vehicle (e.g., to the exterior of the vehicle), such as including the local SA data sensors 60 in the example of FIG. 2. For example, the geographic map data can correspond to a map program that can interact with GNSS data and/or Digital Terrain Elevation Data (DTED) to generate the rendered surroundings of the vehicle (e.g., based on a known location and altitude via GNSS data and/or INS data). The geographic map data can be provided to the vehicle from another vehicle (e.g., from the ancillary control station 56 provided in a battlefield control vehicle) or can be stored in and accessed from the memory system 108. As another example, weather features displayed on the SA video screen 102 can be obtained from meteorological data, such as in combination with the geographic map data, such as likewise provided from another vehicle. Additionally or alternatively, visual data sensors (e.g., radar, lidar, video cameras, and/or a variety of other visual data sensors) can capture images of the surroundings of the vehicle, such that the images of the surroundings can be displayed on the SA video screen 102. The pilot-perspective data on the SA video screen 102 can also be updated in real-time to maintain the visual simulation of the surroundings of the vehicle as the vehicle moves in response to the pilot-controls of the vehicle, thus simulating the motion of the surroundings relative to the vehicle as the vehicle moves.

In addition to displaying the pilot-perspective visual data, the SA video screen 102 can be configured to display a variety of other information that is useful to the pilot. For example, the SA video screen 102 can display vehicle control data, such as primary flight reference data that is traditionally displayed via a heads-up display (HUD) on a typical aircraft (e.g., including altitude, velocity, attitude, etc.). Additionally, as described in greater detail herein, the SA video screen 102 can be configured to display visual indicators of external entities, such as the friendly vehicle(s) 54 and/or adversarial vehicle(s) (e.g., the sixth vehicle 22 in the example of FIG. 1). As described previously, the ancillary control station 56 is configured to generate aggregate SA data that is transmitted to the vehicle 52 via the respective communications systems 72 and 62. The communications interface 106 of the vehicle control system 100 can receive raw SA data or the aggregate SA data (which may or may not be pre-processed, such as at the ancillary control station 56) and the processing system 110 can interpret the SA data, such that the SA data can be displayed on the SA video screen 102 in a form that can be easily interpreted by the pilot.

In the example of FIG. 3, the processing system 110 includes visual data 112, local SA data 114, and external entity data 116 that can be processed by the processing system 110 for display separately on the SA video screen 102. For example, the visual data 112 can correspond to the geographic map data and/or other graphically rendered visual surroundings (e.g., clouds, buildings, mountains, etc.). The local SA data 114 can correspond to interaction of the vehicle 52 itself with the visual data 112, such as GNSS data to locate the vehicle relative to the geographic map data, such as to render the surroundings of the vehicle relative to the actual location, speed, altitude, and other motion characteristics of the vehicle. Additionally, the external entity SA data 116 can correspond to the SA data associated with the external entities of interest in the theater of operation, such as including both friendly vehicles (e.g., the friendly vehicle(s) 54) and adversarial vehicles (e.g., the sixth vehicle 22). As a result, the external entities can be graphically rendered as visual indicators that are superimposed on the pilot-perspective visual data, as provided on the SA video screen 102.

For example, based on the external entity SA data 116, the SA video screen 102 can display a visual indicator of an external entity at an approximate location on the SA video screen 102 that corresponds to an actual location of the external entity relative to the vehicle itself. As a result, the pilot can see the visual indicator of the external entity in the same manner as if looking through a window in the cockpit to see the actual location of the external entity (e.g., at a bearing that is ahead and slightly to the left and above the nose of the aircraft corresponding to the vehicle). However, because the video data that includes the pilot-perspective visual data and the visual indicators superimposed thereon is displayed as graphically rendered to the pilot, the visual indicators can be displayed for the pilot's reference, despite the external entity actually being located much farther than could normally be seen by the naked eye of the pilot.

For example, in a typical vehicle that includes a transparent window through which the pilot can see, the ability to see an external entity is limited by the eyesight of the pilot. However, the SA video screen 102 can display the visual indicator of the external entity to allow the pilot to see the approximate location of the external entity relative to the vehicle, despite the external entity being, for example, hundreds of miles away. As a result, the SA video screen 102 can display an approximate actual location of the external entity in three-dimensional space for reference by the pilot, as opposed to requiring "canopy mapping" or "canopy coding" in typical vehicles, in which the pilot can only determine an approximate location of an external entity based on seeing an approximate location of the external entity on a separate two-dimensional low-resolution overhead view screen and attempting to translate that location to three-dimensional space. Such "canopy mapping" or "canopy coding" can be time consuming, which may be dangerous in certain operating conditions (e.g., combat) and can result in inaccurate determinations of the location of the external entities. Furthermore, given that modern warfare operations typically involve much greater standoff distances between both allied aircraft and adversarial aircraft, as opposed to closely-grouped wingmen and short-range dogfighting of traditional warfare, the SA video screen 102 can provide an easier and greater level of SA to the pilot of the locations of the external entities.

The control inceptor(s) 104 can be configured to provide pilot-control of the vehicle. The control inceptor(s) 104 can include at least one touch-screen control interface, such as similar to a tablet computer, to facilitate interaction of the pilot with the operational components of the vehicle and/or the video data displayed on the SA video screen 102. For example, one of the control inceptor(s) 104 can display adjustable geographic map data of the theater of operation, such as from a far-view overhead perspective (e.g., a "God's eye view") that can be zoom-controlled. For example, the adjustable geographic map data can include a global visual indicator of the vehicle superimposed on the overhead map based on the GNSS data, as well as indicators of external entities (e.g., the friendly vehicle(s) 54 and/or adversarial entities) likewise superimposed on the map based on the received SA data from the other associated vehicles.

As described herein, the vehicle control system 100 is described as providing piloting control of the associated vehicle in which the vehicle control system 100 is included (e.g., in an enclosed windowless cockpit). However, because the SA data is provided to the communications interface 106 and is graphically rendered for display on the SA video screen 102, the piloting control that is provided via the vehicle control system 100 is not limited to control of an associated vehicle in which the vehicle control system 100 is provided. As an example, the vehicle control system 100 can be implemented to providing piloting simulations to the pilot, in addition to being configured to provide actual vehicle control. For example, the vehicle control system 100 can be switched between a vehicle control state and a simulator state, such as based on an input provided via one of the control inceptor(s) 104.

As an example, the vehicle control system 100 can be included in a vehicle, but during the simulator state of the vehicle control system 100, the vehicle control system 100 can allow the pilot to train in a simulated environment without controlling the vehicle. For example, the simulated environment can be stored in the memory system 108, such that the geographic map data and surroundings data can be accessed from the memory system 108 instead of being provided from an aggregate SA data that is transmitted to the vehicle. Alternatively, the simulated environment can be transmitted to the vehicle as part of aggregate SA data, such as from the ancillary control station 56 providing simulated aggregate SA data, that includes simulated external entities, such as controlled by artificial intelligence (AI) or from other actual pilots likewise operating in the simulated environment. As yet another example, the vehicle control system 100 can facilitate a pilot input to access an auto-pilot feature to provide autonomous control of the vehicle. Therefore, during the autonomous control of the vehicle, the vehicle control system 100 can be switched to the simulator mode to provide the piloting simulation, such as via the communications interface 106. As a result, as one example, one or more pilots that are en route to performing a mission can switch to the autopilot feature and to the simulator mode to operate in the same simulated environment to practice or train for the mission objectives in a simulated mission environment before operating in the actual mission environment.

The ability to disconnect control of the vehicle control system 100 from actual control of the vehicle can extend to other applications, as well. As an example, the vehicle control system 100 can also have remote control capability of the vehicle or of other vehicles, as well. For example, the communications interface 106 of the vehicle control system 100 be configured to access the communications system (e.g., the communications system 66 of one of the friendly vehicle(s) 54) of another vehicle, and thus the communications interface 106 can receive the aggregate SA data and local SA data associated with the other vehicle. Therefore, the vehicle control system 100 can be configured to provide the pilot with the ability to remotely pilot the other vehicle. As one example, the vehicle control system 100 can remotely pilot an unmanned aircraft (e.g., a "drone") in a manner that is substantially identical to piloting the actual vehicle. As another vehicle, the vehicle control system 100 can be configured to remotely pilot a manned vehicle, such as in response to an emergency condition (e.g., lack of consciousness of the pilot of the other vehicle). The remote piloting can be performed under a variety of conditions of the vehicle in which the vehicle control system 100 is included, similar to as described previously regarding the simulation. For example, the vehicle control system 100 can provide remote piloting during non-operation of the vehicle, or can provide the remote piloting while the associated vehicle is in an autopilot mode. Accordingly, the vehicle control system 100 is not limited to piloting a single dedicated vehicle.

In addition, as described previously, the vehicle control system 100 can be included in an enclosed windowless cockpit. For example, the enclosed windowless cockpit can be configured to physically and mechanically separate from the associated vehicle. Therefore, in the example of FIG. 3, the vehicle control system 100 further includes a control station mechanical linkage 118 that is configured to provide a variety of different ways to provide physical and mechanical separation of the enclosed windowless cockpit from the associated vehicle. For example, the control station mechanical linkage 118 can be configured to facilitate ejection of the enclosed windowless cockpit from the associated vehicle, such as in response to an emergency ejection command from the at least one control inceptor. As another example, the control station mechanical linkage 118 can be configured to facilitate physical mechanical separation of the enclosed windowless cockpit from the vehicle, and to facilitate recoupling of the enclosed windowless cockpit, such as to a different vehicle, to a simulator cradle (e.g., to provide dedicated simulations), or to a remote vehicle control cradle (e.g., to provide dedicated remote piloting of vehicles). Furthermore, the control station mechanical linkage 118 can facilitate retrofit and variability of the enclosed windowless cockpit into a variety of different types of vehicles, such that the same enclosed windowless cockpit can be configured to fit in many different types of vehicles to facilitate the same manner of piloting for each of the different types of vehicles.

Figure 4:
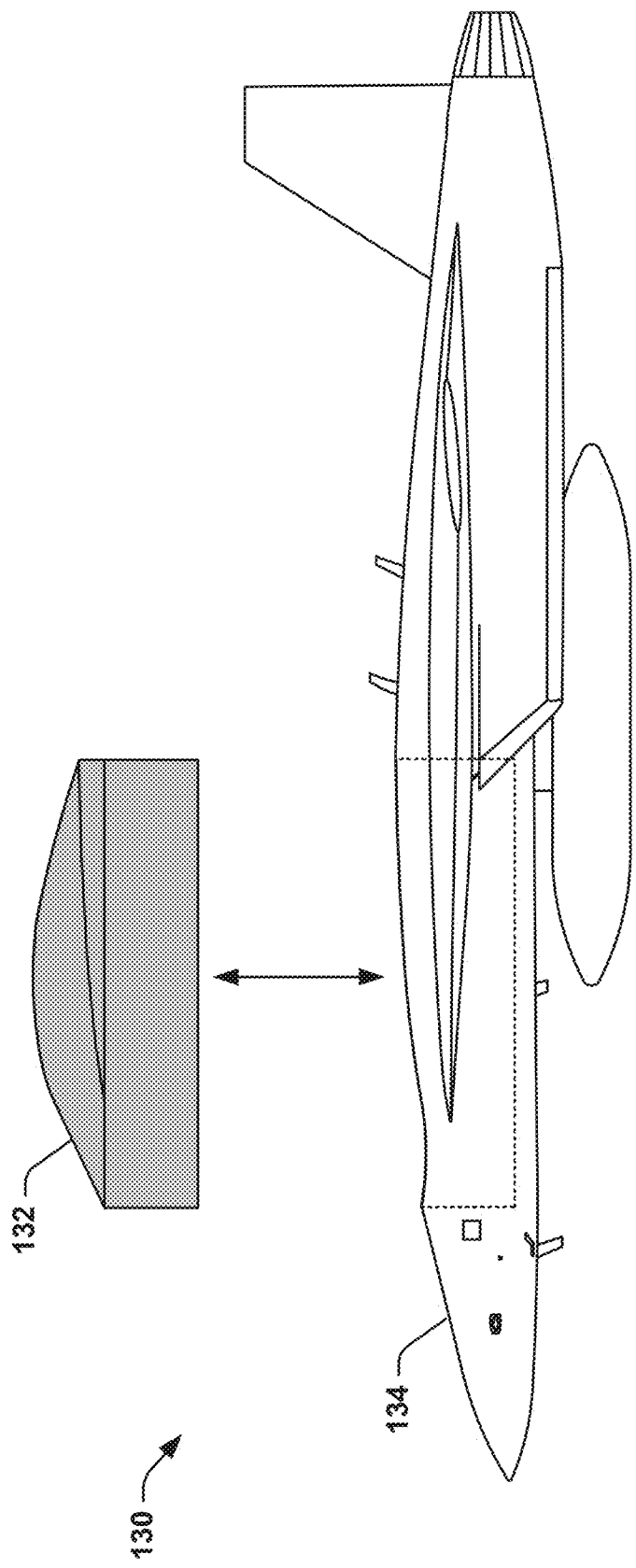
FIG. 4 illustrates an example of an aircraft.

FIG. 4 illustrates an example of an aircraft 130. The aircraft 130 can correspond to the vehicle 52 that includes the vehicle control system 100. Therefore, reference is to be made to the examples of FIGS. 1-3 in the following description of the example of FIG. 4. The aircraft 130 is demonstrated as including an enclosed windowless cockpit 132 that is detachable from the body 134 of the aircraft 130. For example, the enclosed windowless cockpit 132 can include a control station mechanical linkage 118 that can provide a mechanical means of physically detaching and re-attaching the enclosed windowless cockpit 132 from and to the aircraft body 134. As an example, the control station mechanical linkage 118 can include both physical connection hardware, as well as electrical interconnection hardware to facilitate electrical connections between the enclosed windowless cockpit and the electrical and electronic components of the aircraft body 134.

Therefore, as described previously, the control station mechanical linkage (e.g., the control station mechanical linkage 118) can be configured to facilitate physical mechanical separation of the enclosed windowless cockpit 132 from the aircraft body 134, and to facilitate recoupling of the enclosed windowless cockpit 132 to a different vehicle body, which is not limited to being an aircraft of the same type or even an aircraft vehicle. As another example, the enclosed windowless cockpit 132 can be re-attached to a simulator cradle that can provide electrical connectivity to a computer system, a memory, and/or a communications system to provide dedicated simulations to a pilot in the enclosed windowless cockpit 132. As yet another example, the enclosed windowless cockpit 132 can be re-attached to a remote vehicle control cradle that can provide electrical connectivity to a computer system, a memory, and/or a communications system to provide dedicated remote piloting of vehicles. The vehicles that can be remotely piloted can be any of a variety of different types of vehicles. Accordingly, the enclosed windowless cockpit 132, and therefore the vehicle control system 100 therein, can be implemented in a variety of versatile control environments.

Figure 5:
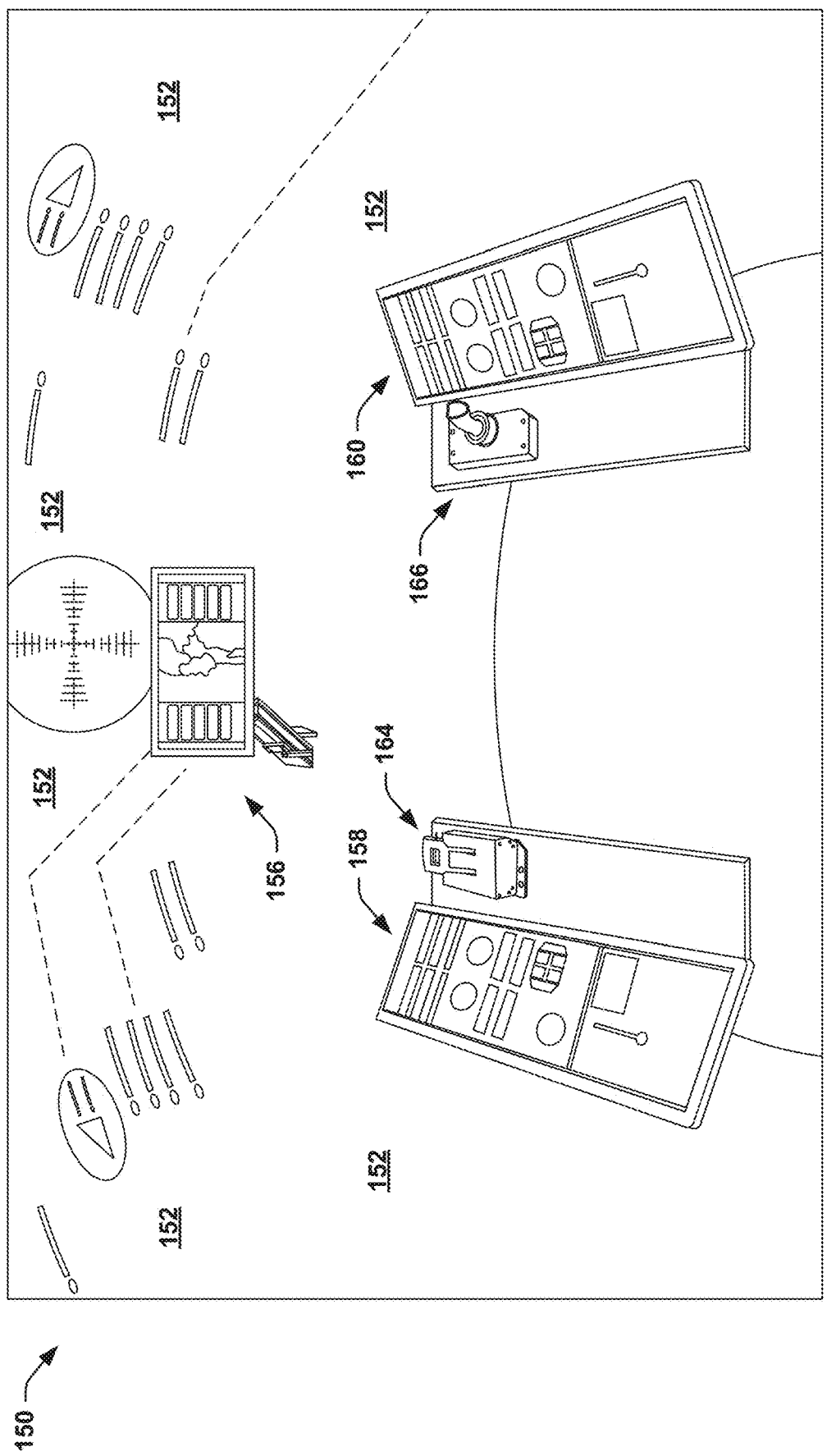
FIG. 5 illustrates an example of a vehicle control system.
Figure 6:
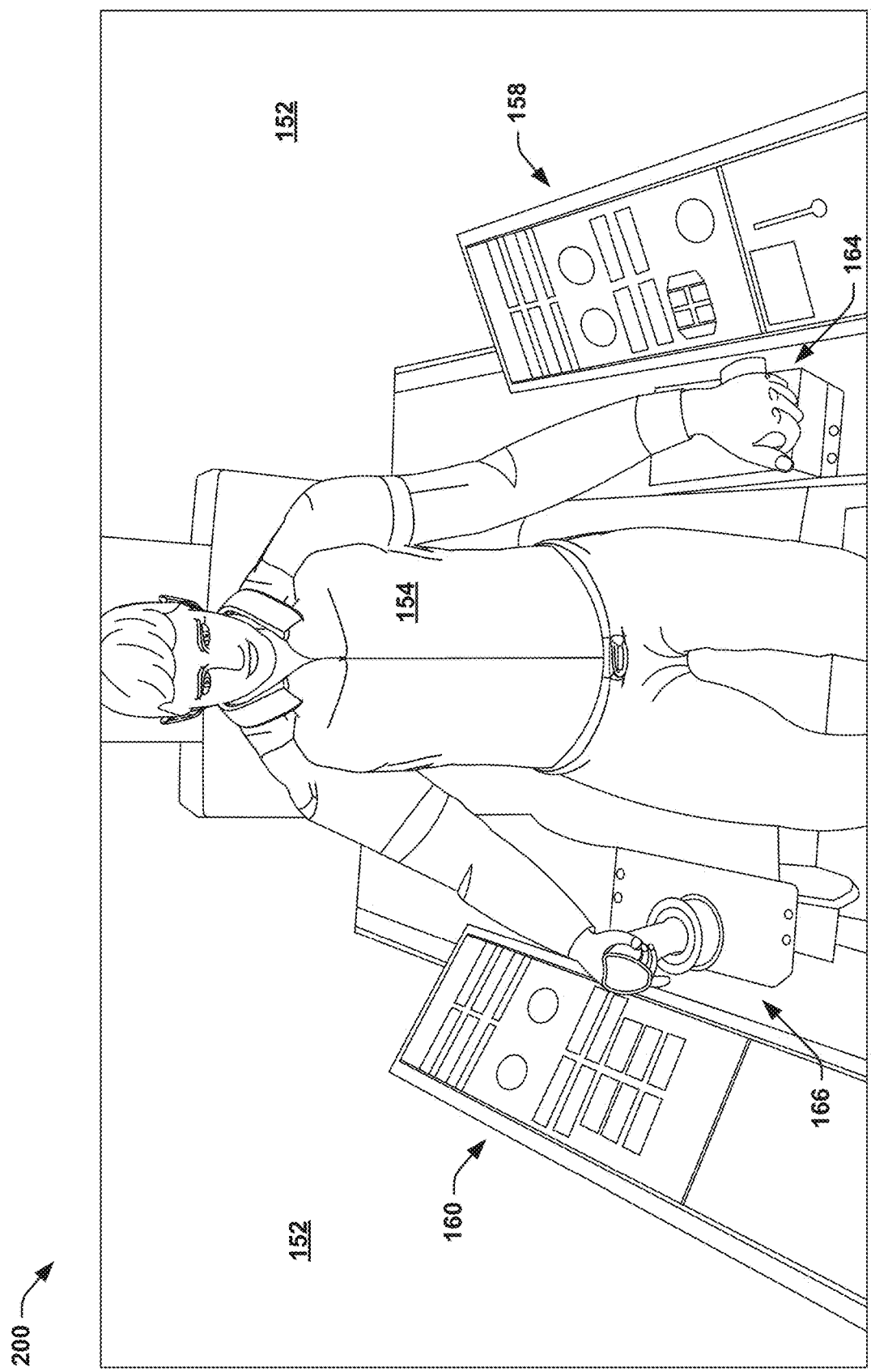
FIG. 6 illustrates another example of a vehicle control system.
Figure 7:
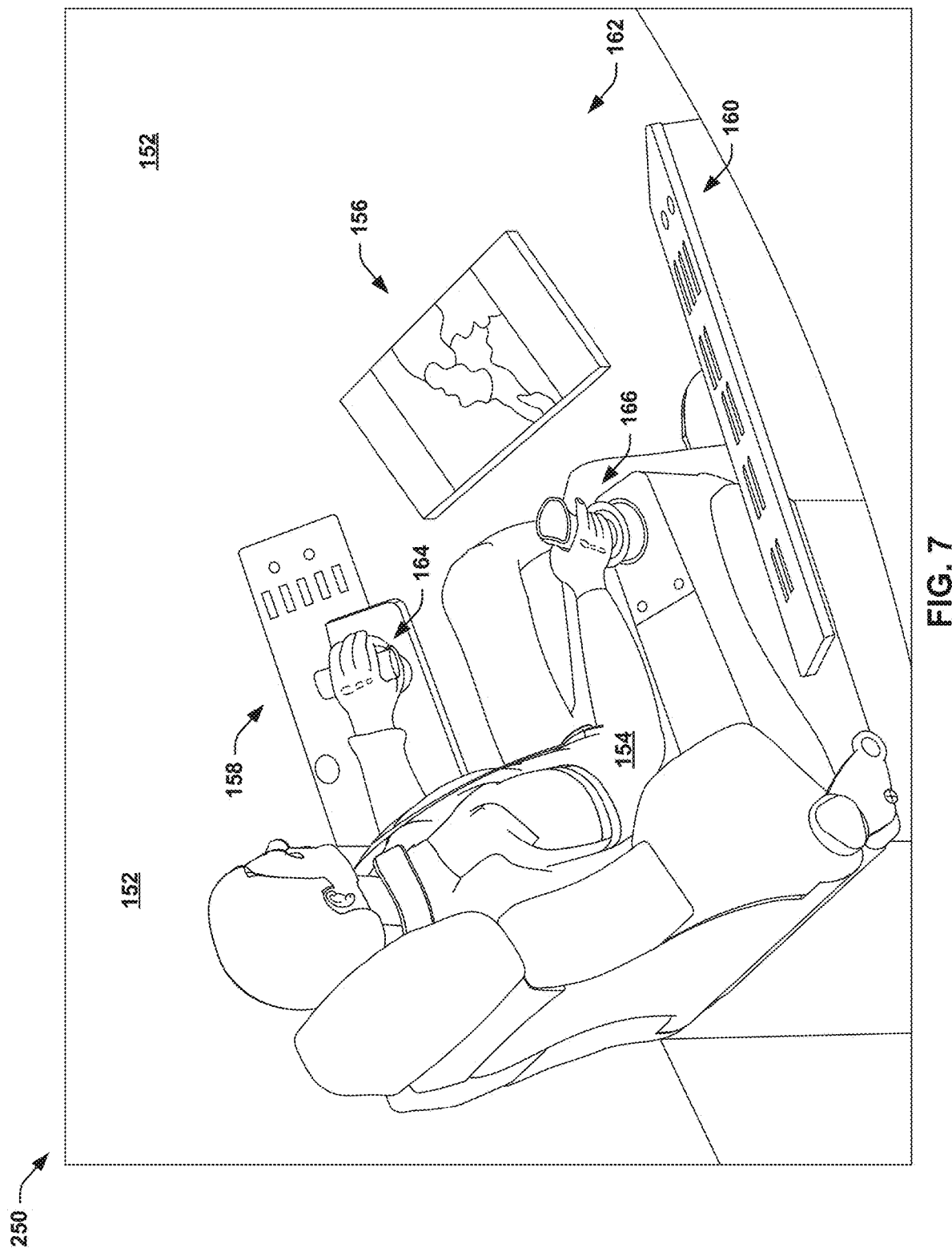
FIG. 7 illustrates yet another example of a vehicle control system.
Figure 8:
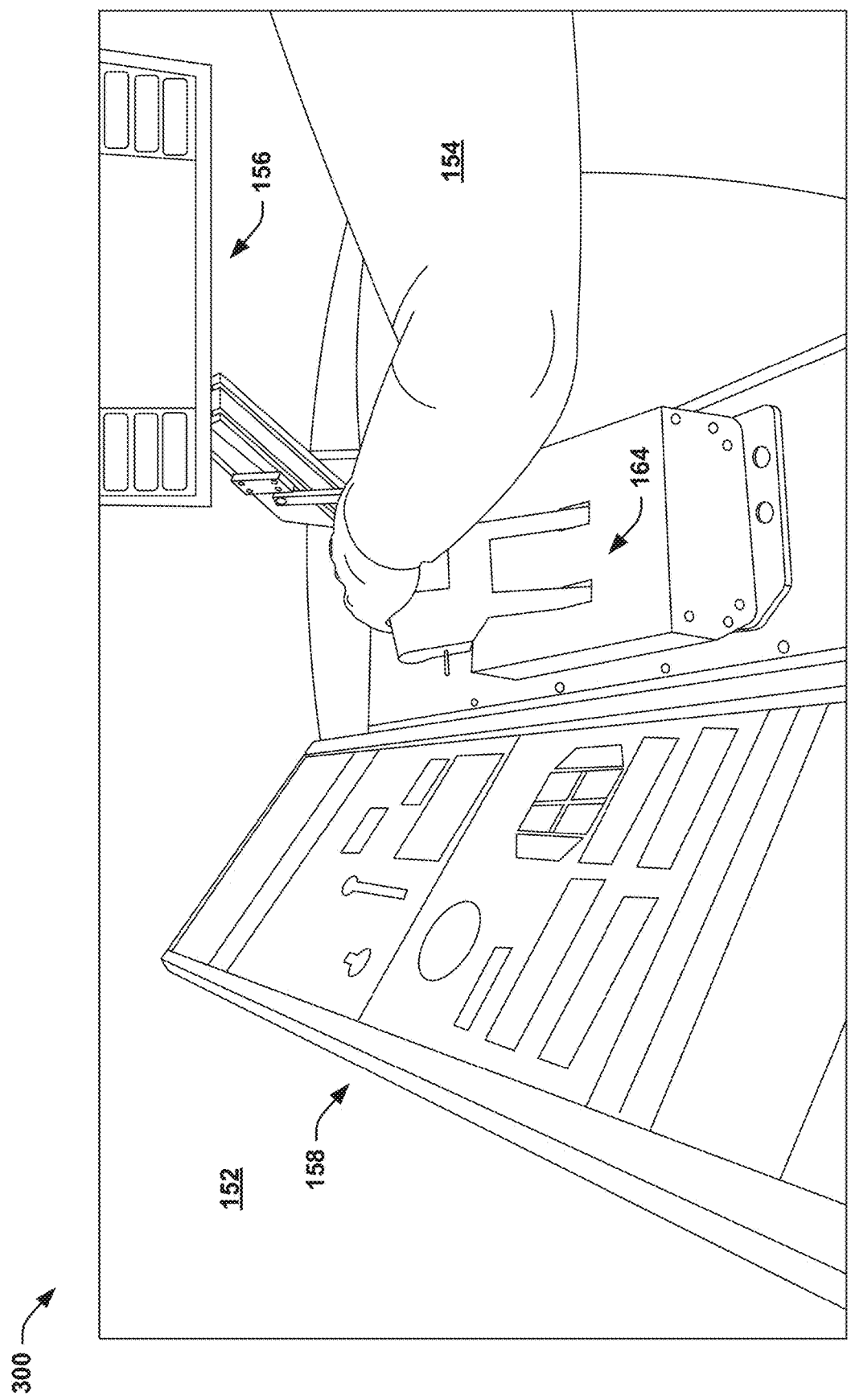
FIG. 8 illustrates yet another example of a vehicle control system.

FIGS. 5-8 illustrate various examples of a vehicle control system. FIG. 5 illustrates a first example of the vehicle control system, demonstrated at 150, that corresponds to an approximation of a pilot-perspective of the vehicle controls. Therefore, the vehicle control system 150 is demonstrated without the pilot or the pilot's seat. FIG. 6 illustrates a second example of the vehicle control system, demonstrated at 200, that corresponds to an approximately reverse view of the example of FIG. 5, in which the pilot operates the vehicle via the vehicle control system. FIG. 7 illustrates a third example of the vehicle control system, demonstrated at 250, that corresponds to an approximate side view of the example of FIGS. 5 and 6, in which the pilot operates the vehicle via the vehicle control system. FIG. 8 illustrates a fourth example of the vehicle control system, demonstrated at 300, that corresponds to a zoomed-in view of some of the controls of the vehicle control system. The vehicle control system demonstrated in the examples of FIGS. 5-8 can correspond to the vehicle control system 100 in the example of FIG. 3, such as for at least the first vehicle 12 in the example of FIG. 1. Therefore, reference is to be made to the example of FIGS. 1-3 in the following description of the examples of FIGS. 5-8. Additionally, like reference numbers are used in the examples of FIGS. 5-8 based on the various views of the same vehicle control system.

The vehicle control system includes an SA video screen 152 that is configured to display video data to the pilot, demonstrated at 154. The video data includes pilot-perspective visual data corresponding to a real-time dynamic virtual representation of surroundings of the associated vehicle that simulates a real-world visual perspective of the pilot 154 to the surroundings of the vehicle. The surroundings can include physical objects (e.g., other vehicles, land-features, buildings, etc.), and can also include weather features (e.g., clouds, rain, etc.). Similar to as described previously, the vehicle control system can be incorporated in an enclosed windowless cockpit. As a result, the video data can replace the perspective view of the pilot 154 of the surroundings that the pilot 154 would normally experience by looking out of the cockpit windows, such that the video data simulates the perspective view of the pilot 154 of the surroundings in a graphically-rendered manner.

In the examples of FIGS. 5-8, the SA video screen 152 is demonstrated in a non-planar wrap-around form. As a result, the pilot-perspective visual data is provided to the pilot 154 at multiple directional viewing perspectives with respect to the vehicle. Therefore, the surroundings of the vehicle that are physically located to the port and starboard directions of the vehicle can be displayed to the pilot 154 on the SA video screen 152 as being left and right, respectively, in corresponding locations to the perspective of the pilot 154 (e.g., with respect to image size and location) as the real-life surroundings relative to the vehicle. In the examples of FIGS. 5-8, the non-planar SA video screen 152 is demonstrated as being provided in front of and to the right and left of the pilot 154. However, the SA video screen 152 and/or additional SA video screens 152 can be provided above, below, and/or behind the pilot 154, as well, to provide additional pilot-perspective view of the surroundings of the vehicle.

As an example, the pilot-perspective visual data can be rendered on the SA video screen 152 based on at least one of geographic map data and image data obtained from sensors that are coupled to the vehicle (e.g., to the exterior of the vehicle). For example, the geographic map data can correspond to a map program that can interact with GNSS data and/or DTED to generate the rendered surroundings of the vehicle (e.g., based on a known location and altitude via GNSS data and/or INS data). The geographic map data can be provided to the vehicle from another vehicle (e.g., the ancillary control station 56) or can be stored in and accessed from a memory (e.g., the memory system 108). As another example, weather features displayed on the SA video screen 152 can be obtained from meteorological data, such as in combination with the geographic map data, such as likewise provided from another vehicle. Additionally or alternatively, visual data sensors (e.g., radar, lidar, video cameras, and/or a variety of other visual data sensors) can capture images of the surroundings of the vehicle, such that the images of the surroundings can be displayed on the SA video screen 152. Additionally, the pilot-perspective data can also be updated in real-time to maintain the visual simulation of the surroundings of the vehicle as the vehicle moves in response to the pilot-controls of the vehicle, thus simulating the motion of the surroundings relative to the vehicle as the vehicle moves.

The vehicle control system also includes at least one control inceptor to provide pilot-control of the vehicle. The control inceptors include a first control inceptor 156, a second control inceptor 158, and a third control inceptor 160. The first control inceptor 156 is demonstrated as a touch-screen control interface, such as similar to a tablet computer. The first control inceptor 156 can display adjustable geographic map data, such as from a far-view overhead perspective that can be zoom-controlled. For example, the adjustable geographic map data can include a global visual indicator of the vehicle superimposed on the overhead map based on the GNSS data, as well as indicators of external entities likewise superimposed on the map based on the received SA data from the other associated vehicles. As another example, as described in greater detail herein, the first control inceptor 156 can also facilitate inputs from the pilot 154 to interact with the video data that is displayed on the SA video screen 152.

As yet another example, the first control inceptor 156 can implement the geographic map data for assisting the pilot in navigating the vehicle. For example, the pilot can provide touch-screen inputs on the geographic map of the theater of operation to automatically set a point-of-interest that can correspond to a destination point, a way-points, or another navigation point of interest. In response, as an example, the vehicle can change course to automatically navigate to the associated physical geographic area that corresponds to the point-of-interest on geographic map displayed by the first control inceptor 156. As another example, in response to selection of the point-of-interest on the geographic map, the first control inceptor 156 can coordinate the route with the SA video screen 152, such that the SA video screen 152 can provide any of a variety of visual indicators (e.g., arrows or a highlighted or translucent flight path) to assist in allowing the pilot to manually navigate the vehicle to the associated physical geographic area that corresponds to the point-of-interest on geographic map. Accordingly, the pilot can coordinate navigation between the first control inceptor 156 and the data displayed on the SA video screen 152.

As an example, the first flight inceptor 156 can be configured to display a variety of other types of data to the pilot. For example, the first flight inceptor 156 can be flight certified (e.g., flight critical certified) to provide a robust solution to piloting in the event of failure of the SA video screen 152. Therefore, the first flight inceptor 156 can likewise be configured to display vehicle control data, such as primary flight reference data that is traditionally displayed via a heads-up display (HUD) on a typical aircraft (e.g., including altitude, velocity, attitude, etc.). Therefore, the first flight inceptor 156 can likewise provide the pilot with sufficient data to pilot the vehicle without an operational SA video screen 152, such as in response to damage to or malfunction of the SA video screen 152. As another example, the first flight inceptor 156 can be configured to display mission system data that can support the pilot in achieving mission objectives. Furthermore, the first flight inceptor 156 is not limited to being configured as a touch-screen control interface, but could also include physical controls (e.g., buttons, knobs, etc.) as well.

As an example, the second and third control inceptors 158 and 160 can correspond to touch-screen control interfaces for facilitating pilot-control of the operational components of the vehicle. For example, the second and third control inceptors 158 and 160 can include touch-screen buttons and navigation menus to allow the pilot 154 to access non-routine controls of the vehicle, such as for takeoff and landing, launching/controlling ordnance, accessing status indicators, and other controls that are typically associated with dashboard controls, instrument panel controls, and indicators of traditional vehicle controls. In addition, the control inceptors 156, 158, and 160 can be adjustable in location to suit the varying dimensions of the pilot 154. For example, as demonstrated in the example of FIG. 7, the first control inceptor 156 includes an articulating bracket 162 that secures the first control inceptor 156 to the associated cockpit. The articulating bracket 162 can facilitate manipulating the first control inceptor 156 between an upright position (e.g., to provide viewing of and interaction with the first control inceptor 156 at an approximate eye-level of the pilot 154) and an approximately horizontal table position (e.g., to set the first control inceptor 156 as a tray-table arranged at or near the lap of the pilot 154). Therefore, the articulating bracket 162 can allow the first control inceptor 156 to be articulating to allow variation in accessibility, view, and manipulation by the pilot 154.

The operational components of the vehicle are not limited to control via the second and third control inceptors 158 and 160, but can also be facilitated by the first control inceptor 156 and/or additional hardware components (e.g., switches, buttons, etc.). As also demonstrated in the examples of FIGS. 5-8, the vehicle control system also includes physical control inceptors, demonstrated in the examples of FIGS. 5-8 as a throttle lever 164 and a flight-stick 166. As an example, the throttle lever 164 and the flight-stick 166 can be mechanically coupled to the operational components of the vehicle, or can be electrically coupled to the operational components (e.g., to provide simulation and remote control capability), and can include hardware buttons to provide additional pilot control of the operational components of the vehicle. Therefore, the vehicle control system can maintain traditional pilot controls for more routine operational control of the respective vehicle.

Figure 9:
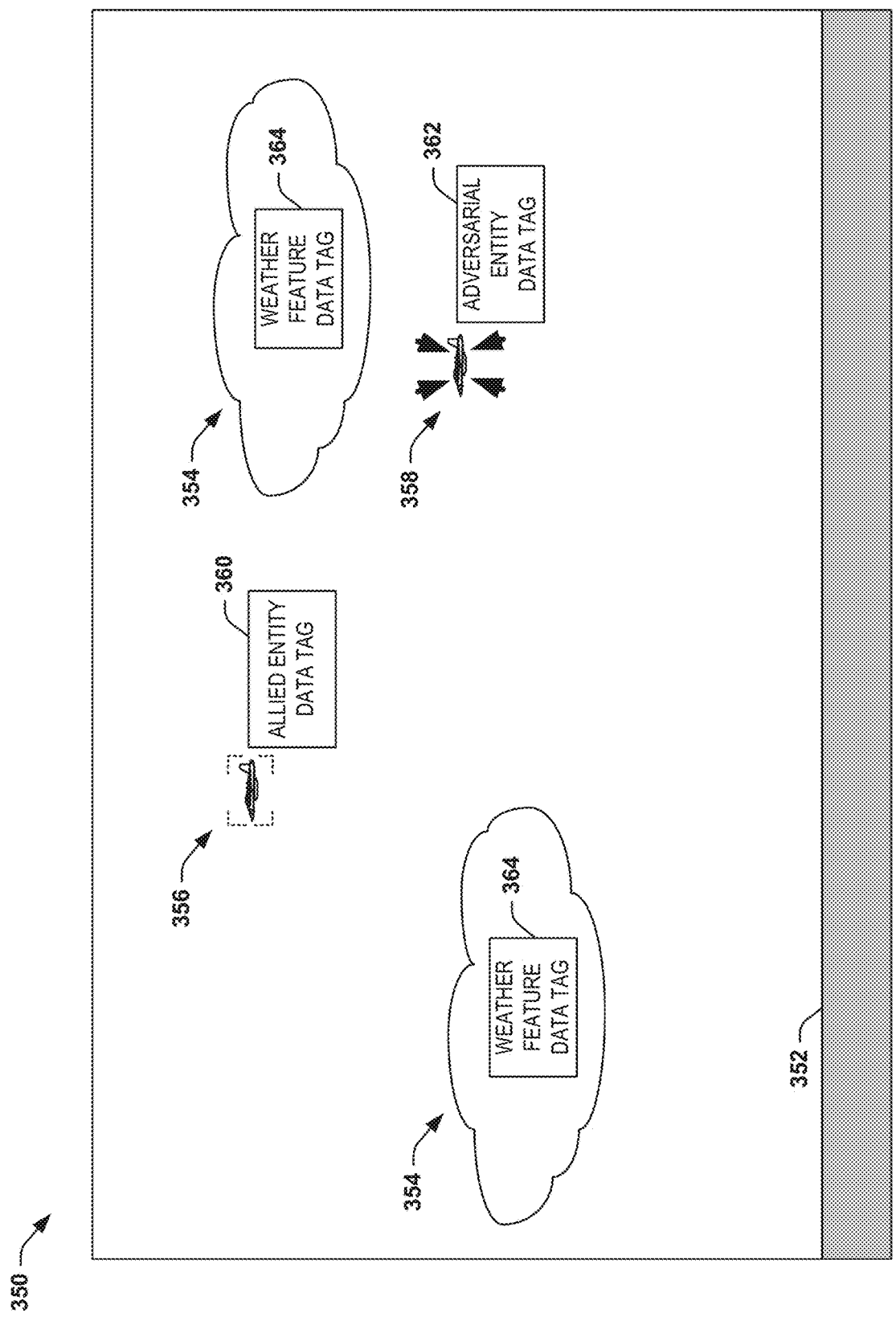
FIG. 9 illustrates an example diagram of SA video data.

FIG. 9 illustrates an example diagram 350 of SA video data. The diagram 350 can correspond to a two-dimensional example of the video data that is displayed on the SA video screens 102 and 152. Therefore, reference is to be made to the examples of FIGS. 1-8 in the following description of the example of FIG. 9. It is to be understood that the example of FIG. 9 is demonstrated simplistically for efficiency in description, and that the displayed video data can be significantly more detailed and higher resolution.

The diagram 350 demonstrates, generally, pilot-perspective visual data that corresponds to the surroundings of the vehicle. In the example of FIG. 9, the vehicle corresponds to an aircraft, such that the pilot-perspective visual data corresponds to an approximation of what the pilot would actually see if looking out of a transparent window, as in a typical aircraft. The pilot-perspective visual data therefore includes a horizon 352 that can include detailed graphical rendering of land features in locations corresponding to an actual location of the land features relative to the vehicle. The pilot-perspective visual data also includes weather features, demonstrated as clouds 354. As described previously, the SA video screen 152 can be non-planar to provide a three-dimensional representation of multiple viewing perspectives of the surroundings of the vehicle to the pilot. Furthermore, the pilot-perspective visual data can be updated in response to motion of the vehicle to maintain the real-time graphical rendering of the surroundings of the vehicle to the pilot at the approximate actual locations of the actual surroundings of the vehicle in three-dimensional space.

The diagram 350 also demonstrates visual indicators of external entities. In the example of FIG. 9, the visual indicators of the external entities are demonstrated as a first visual indicator 356 corresponding to an allied aircraft and a second visual indicator 358 corresponding to an adversarial aircraft. The visual indicators 356 and 358 can be superimposed on the pilot-perspective visual data at locations that correspond to the approximate actual locations of the allied aircraft and the adversarial aircraft, respectively, relative to the heading of the aircraft vehicle. For example, as described previously, the communications interface 106 of the vehicle control system 100 can receive the aggregate SA data that includes the SA data associated with the allied aircraft and the adversarial aircraft. For example, the SA data associated with the allied aircraft can be generated by the allied aircraft and transmitted to the ancillary control station 56, which then transmits the SA data associated with the allied aircraft to the aircraft vehicle (e.g., as part of an aggregate SA data). As another example, another vehicle (e.g., including the ancillary control station 56) can detect the adversarial aircraft and can generate adversarial SA data associated with the adversarial aircraft, which can then be transmitted to the aircraft vehicle. Alternatively, the aircraft vehicle can directly receive the SA data associated with the allied aircraft (e.g., from the allied aircraft itself) and the adversarial SA data (e.g., from local sensors). In either example, the processor 110 can process the SA data to determine the relative location of the allied aircraft and the adversarial aircraft relative to the heading of the aircraft vehicle and can superimpose the visual indicators 356 and 358 in the appropriate location on the pilot-perspective visual data.

Based on the relative location of the location of the visual indicators 356 and 358 on the pilot-perspective visual data, the pilot can ascertain some information regarding the location of the respective allied aircraft and adversarial aircraft, such as a relative altitude and location relative to the bearing of the aircraft vehicle. As a result, there is no need for the pilot to perform "canopy mapping" or "canopy coding" by translating an approximate location of the external entities to three-dimensional space from a separate two-dimensional low-resolution overhead view screen. In addition, as described previously, the visual indicators 358 and 360 can be displayed to provide the pilot with information as to the location of the respective aircraft, which can be significantly farther away from the aircraft vehicle than can be seen by the naked eye (e.g., for external entities that are hundreds of miles or more away). Additionally, the visual indicators 356 and 358 can be displayed in a manner that provides some additional visual information to the pilot. For example, the visual indicators 356 and 358 can be graphical representations of the type of vehicle that they represent, and can be dynamically rendered to demonstrate a bearing of the respective vehicles.

As another example, the visual indicators 356 and 358 can include additional display details, such as being displayed at different sizes that each correspond to a separate range of distances that the respective vehicle is located relative to the aircraft vehicle, and/or can include leader-lines extending from the visual indicators 356 and 358 to provide visual representations of the heading and/or velocity of the respective aircraft. In addition, in the example of FIG. 9, the visual indicators 356 and 358 can be accompanied by additional visual cues, such as to demonstrate a relative threat level. For example, the additional visual cues can include a lighter halo or cursor surrounding the visual indicators to represent an allied external entity, such as the dotted line box around the visual indicator 356 to represent the friendly nature of the allied aircraft. As another example, the additional visual cues can include a darker or flashing cursor surrounding the visual indicators to represent an adversarial external entity, such as the dark arrows around the visual indicator 358 to represent the hostile nature of the adversarial aircraft. Therefore, the pilot can be quickly alerted to potential threats or can quickly discern between friendly and hostile entities.

Furthermore, as demonstrated in the example of FIG. 9, the SA video screen 152 can also display data tags associated with the external entities to the pilot. In the example of FIG. 9, the SA video screen 152 displays an allied entity data tag 360 associated with the allied aircraft and proximal to the visual indicator 356, and displays an adversarial entity data tag 362 associated with the adversarial aircraft and proximal to the visual indicator 358. The data tags 360 and 362 can be configured to display additional information associated with the allied aircraft and the adversarial aircraft, respectively. For example, the data tags 360 and 362 can provide cursory information that can provide assistance to the pilot in making quick decisions as to piloting the aircraft vehicle. As an example, the data tags 360 and 362 can include an identifier of the external entity (e.g., for the allied aircraft), such that the pilot can quickly ascertain the identity of the external entity (e.g., by alpha numeric code, call-sign, or other identifier). The data tags 360 and 362 can also specific altitude and range information of the respective aircraft. For example, because the visual indicators 356 and 358 are displayed on the SA video screen 152, as opposed to the external entities being physically seen by the pilot, the pilot may need to be able to quickly ascertain how far away the respective aircraft are from the aircraft vehicle. Additionally, the data tags 358 and 360 can include other cursory information, such as relevant status information (e.g., approaching, disabled, damaged, etc.).

Similar to the data tags 360 and 362 of the external entities, the weather features can also include data tags, demonstrated as weather feature data tags 364 associated with the clouds 354. For example, the weather feature data tags 364 can provide basic information regarding the weather feature, such as an approximate distance from the aircraft vehicle to the weather feature, a relative visibility within the weather feature, a relative danger of the weather feature, or any of a variety of other types of information that can assist the pilot with respect to the weather feature. Similar data tags can be displayed for land features, as well, such as mountains, to provide greater SA to the pilot.

Figure 10:
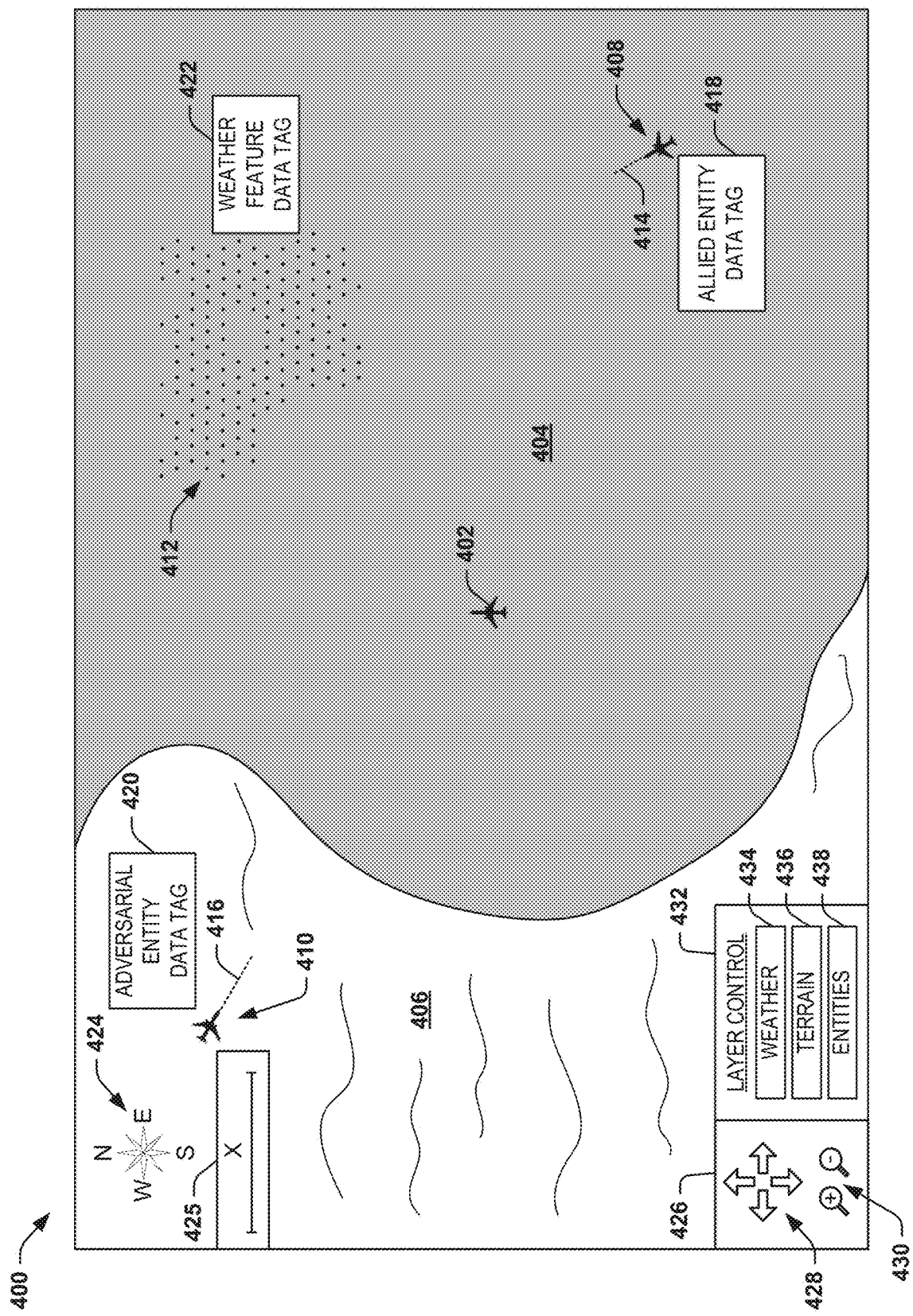
FIG. 10 illustrates another example diagram of SA video data.

FIG. 10 illustrates another example diagram 400 of SA video data. The SA video data can be displayed, for example, on the first control inceptor 156 to provide a far-range overhead view of the theater of operation. Therefore, reference is to be made to the example of FIGS. 1-8 in the following description of the example of FIG. 10.

In the example of FIG. 10, the diagram 400 demonstrates an overhead view of the aircraft vehicle 402 that can remain centered on the displayed SA video data that is displayed as a two-dimensional geographic map. As a result, the pilot can have a far-range overhead view of the theater of operation that surrounds the aircraft vehicle 402 which the pilot controls via the vehicle control system 100. As an example, the aircraft vehicle 402 can be displayed in any of a variety of ownships (e.g., centered, edge-justified, birds-eye view, etc.), and is therefore not limited to be demonstrated in the center of the map of the theater of operation. In the example of FIG. 10, the SA video data is demonstrated as including both land, at 404, and sea, at 406. Therefore, the displayed SA video data can provide navigation assistance for the pilot. The diagram 400 also demonstrates visual indicators of external entities. In the example of FIG. 10, the visual indicators of the external entities are demonstrated as a first visual indicator 408 corresponding to an allied aircraft and a second visual indicator 410 corresponding to an adversarial aircraft, as well as a weather feature (e.g., cloud) at 412. The visual indicators 408, 410, and 412 can be superimposed on the geographic map at locations that correspond to the approximate actual locations of the allied aircraft and the adversarial aircraft, respectively, relative to the location of the aircraft vehicle 402.

As an example, as described previously, the communications interface 106 of the vehicle control system 100 can receive the aggregate SA data that includes the SA data associated with the allied aircraft and the adversarial aircraft. For example, the SA data associated with the allied aircraft can be generated by the allied aircraft and transmitted to the ancillary control station 56, which then transmits the SA data associated with the allied aircraft to the aircraft vehicle 402 (e.g., as part of an aggregate SA data). As another example, another vehicle (e.g., including the ancillary control station 56) can detect the adversarial aircraft and can generate adversarial SA data associated with the adversarial aircraft, which can then be transmitted to the aircraft vehicle 402. Alternatively, the aircraft vehicle 402 can directly receive the SA data associated with the allied aircraft (e.g., from the allied aircraft itself) and the adversarial SA data (e.g., from local sensors). In either example, the processor 110 can process the SA data to determine the relative location of the allied aircraft and the adversarial aircraft relative to the heading of the aircraft vehicle 402 and can superimpose the visual indicators 408 and 410 in the appropriate location on the geographic map data.

As described previously, the visual indicators 408 and 410 of the allied and adversarial aircraft, respectively, can be displayed to provide the pilot with immediate information as to the location of the respective aircraft. Additionally, the visual indicators 408 and 410 are displayed as including leaders, demonstrated as leading dotted lines 414 and 416, respectively, to indicate a bearing of the respective allied and adversarial aircraft. As an example, the leaders 414 and 416 can have a length that can be correlated to an approximate relative velocity.

Furthermore, as demonstrated in the example of FIG. 10, the diagram 400 also includes data tags associated with the external entities, similar to as described previously in the example of FIG. 9. In the example of FIG. 10, the diagram 400 includes an allied entity data tag 418 associated with the allied aircraft and proximal to the visual indicator 408, and an adversarial entity data tag 420 associated with the adversarial aircraft and proximal to the visual indicator 410. The data tags 418 and 420 can be configured to display additional information associated with the allied aircraft and the adversarial aircraft, respectively. For example, the data tags 418 and 420 can provide cursory information that can provide assistance to the pilot in making quick decisions as to piloting the aircraft vehicle 402. As an example, the data tags 418 and 420 can include specific altitude and range information of the respective aircraft. Additionally, the data tags 418 and 420 can include other cursory information, such as relevant status information (e.g., approaching, disabled, damaged, etc.).

Similar to the data tags 418 and 420 of the external entities, the weather features can also include data tags, demonstrated as a weather feature data tag 422 associated with the clouds 410. For example, the weather feature data tags 422 can provide basic information regarding the weather feature, such as an approximate distance from the aircraft vehicle 402 to the weather feature, a relative visibility within the weather feature, a relative danger of the weather feature, or any of a variety of other types of information that can assist the pilot with respect to the weather feature. Similar data tags can be displayed for land features, as well, such as mountains, to provide greater SA to the pilot.

In the example of FIG. 10, the SA video data can assist the pilot in navigating in the theater of operation. The diagram 400 also includes a compass rose 424, a distance scale 425, and a set of controls 426 that can assist the user in navigating through the theater of operation. The set of controls 426 includes direction arrows 428 to allow the user to pan over the overhead view of the theater of operation, such as to explore other portions of the theater of operation corresponding to respective other portions of the surrounding geographic region. Additionally, the set of controls 426 also includes zoom controls 430 to zoom in and out in the overhead view, such as to see more or less of the portion of the theater of operation, and thus the corresponding portion of the geographic region.

Furthermore, the diagram 400 includes layer controls 432 that can allow the pilot to control the amount of information that is displayed on the SA video data (e.g., on the first control inceptor 156). In the example of FIG. 10, the layer controls 432 include weather layer controls 434, terrain layer controls 436, and entities layer control 438. The layer controls 432 can thus allow the pilot to deactivate certain graphical layers to control what the pilot sees in the SA video data. For example, if the pilot is unconcerned about weather features, and does not weather features displayed, then the pilot can toggle the weather layer controls 434 to deactivate the display of the clouds 412, which may or may not likewise include the weather feature data tag 422. The pilot can thus similarly control the display of the displayed terrain and/or the external entities using the terrain layer controls 436 and entities layer control 438, respectively. Therefore, the pilot can exhibit control of the SA video data.

Figure 11:
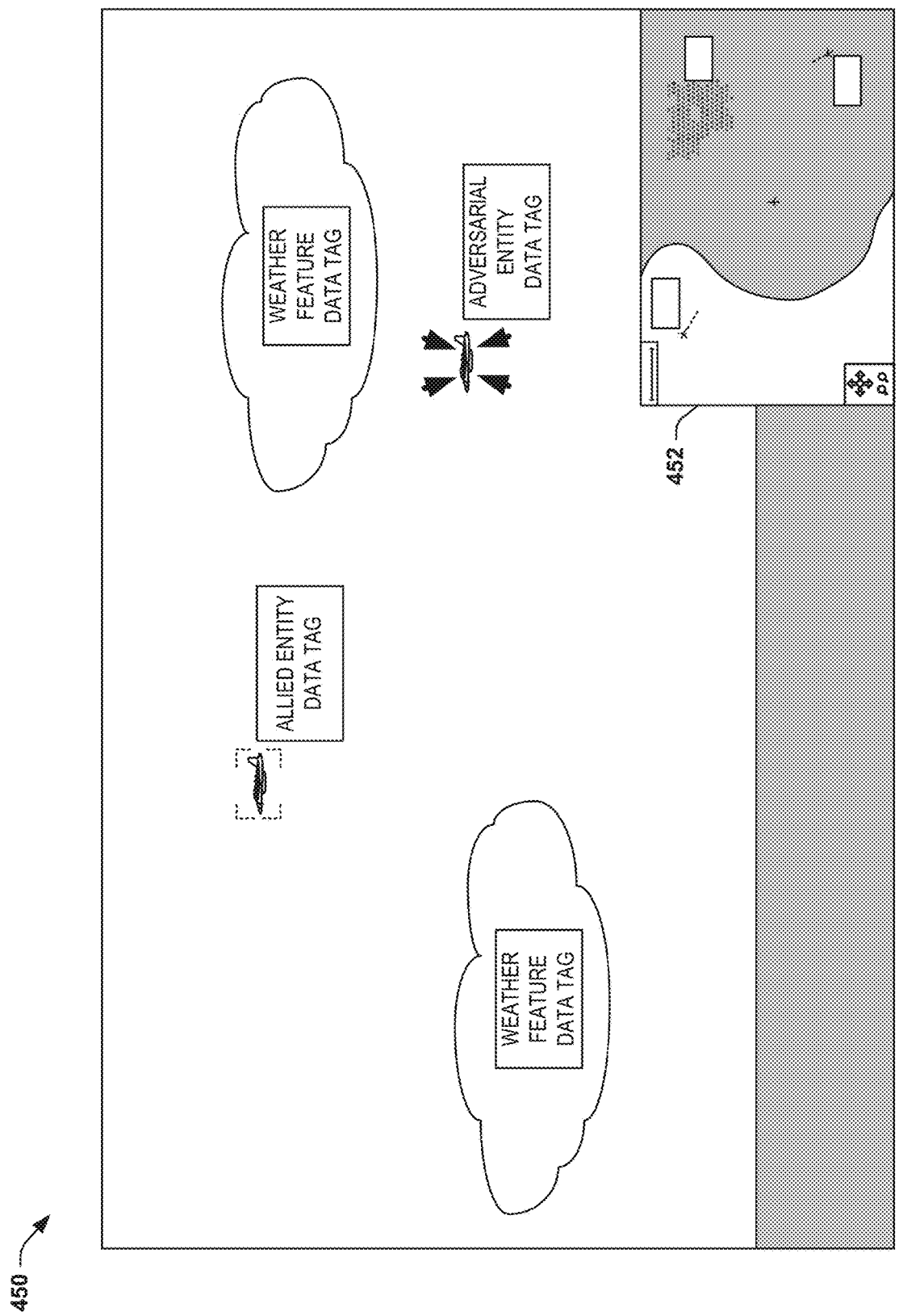
FIG. 11 illustrates yet another example diagram of SA video data.

In addition, the pilot can not only control the SA video data that is displayed on the first control inceptor 156, but also on the SA video screen 152, such as using pilot controls that are incorporated on the first control inceptor 156. FIG. 11 illustrates yet another example diagram 450 of SA video data. The diagram 450 can correspond to a two-dimensional example of the video data that is displayed on the SA video screens 102 and 152. Therefore, reference is to be made to the examples of FIGS. 1-9 in the following description of the example of FIG. 11. It is to be understood that the example of FIG. 11 is demonstrated simplistically for efficiency in description, and that the displayed video data can be significantly more detailed and higher resolution.

The diagram 450 is demonstrated in the example of FIG. 11 substantially similar to the diagram 350 in the example of FIG. 9, and is therefore a recreation of the SA video data displayed on the SA video screen 152 that includes the pilot-perspective visual data and superimposed graphical indicators. However, the diagram 450 also includes a video window 452 that is superimposed over the pilot-perspective visual data. The video window 452 can correspond to the SA video data that is displayed, for example, on the first control inceptor 156, such as similar to the SA video data demonstrated in the diagram 400 in the example of FIG. 10. For example, the pilot can provide an input on the first control inceptor 156 (e.g., a touch input) to generate the video window 452 to provide greater ease at seeing both the pilot-perspective visual data as well as the overhead view of the theater of operation.

Other manipulation of the SA video data displayed on the SA video screen 152 can also be provided in response to pilot inputs (e.g., touch inputs), such as via the first control inceptor 156. For example, the pilot can generate other video windows, as well, such as a "rear-view", "side-view", or other types of views that can assist the pilot in navigating and/or avoiding danger. As another example, given that the geographic map data can be associated with the entirety of the theater of operation or more, the pilot can navigate through pilot-perspective visual data that is not associated with the immediate surroundings of the aircraft vehicle. For example, the pilot can use the pilot controls to display SA video data on the SA video screen 152 that is associated with virtual locations away from the aircraft vehicle, thereby seeing surroundings of the virtual location as if the pilot was actually located at the virtual location. As yet another example, the pilot can implement layer control on the SA video data that is displayed on the SA video screen 152 to control the amount of visual information that is displayed on the SA video screen 152. Furthermore, using the pilot inputs (e.g., touch inputs) via one of the control inceptors (e.g., the first control inceptor 156), the pilot can navigate through the SA video data to interact with the visual indicators, thereby seeing additional SA data associated with the respective external entities.

Figure 12:
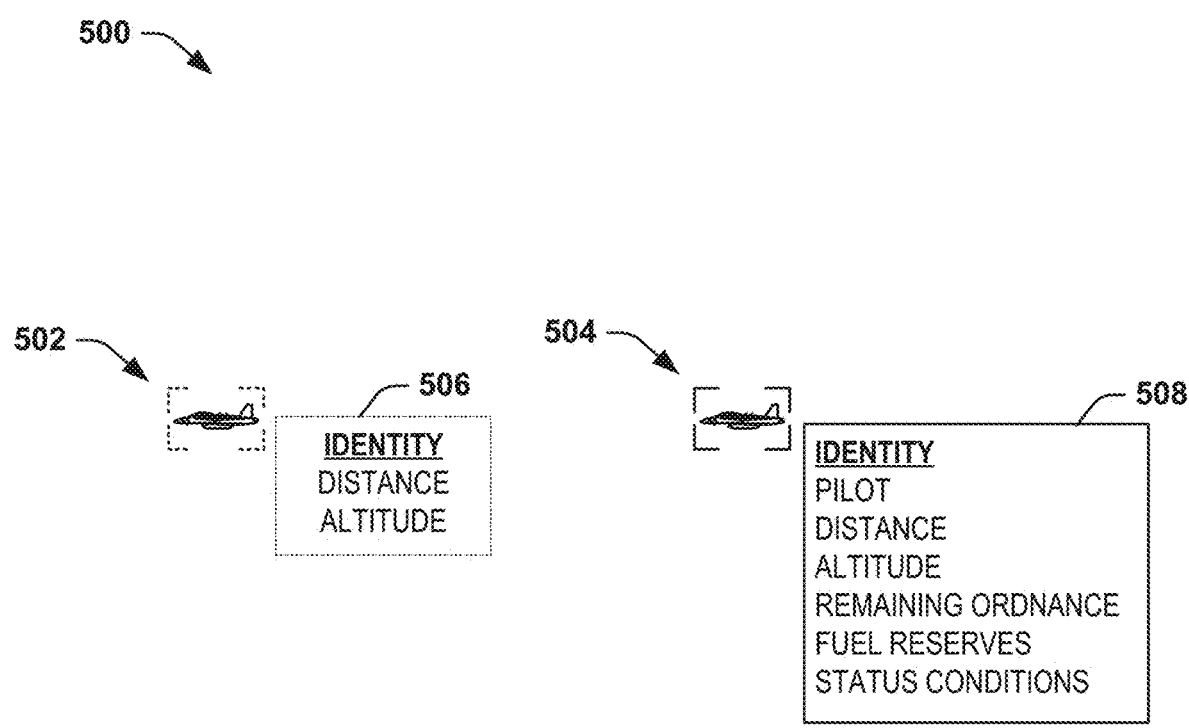
FIG. 12 illustrates an example of visual indicators associated with SA video data.

FIG. 12 illustrates an example diagram 500 of visual indicators associated with SA video data. The diagram 500 demonstrates a first visual indicator 502 with a respective first data tag 504 and a second visual indicator 506 with a respective second data tag 508. As described herein, the first and second visual indicators 502 and 504, and thus the first and second data tags 506 and 508, can correspond to the same external entity in two separate states. The visual indicators 502 and 504 and respective data tags 506 and 508 can correspond to the visual indicators demonstrated in the examples of FIGS. 9-11. Therefore, reference is to be made to the examples of FIGS. 1-11 in the following description of the example of FIG. 12.

As an example, the first visual indicator 502 can correspond to a default visual indicator that is displayed on the SA video screen 152 based on the external entity SA data. Therefore, as an example, the respective data tag 506 can include cursory information regarding the external entity to which the visual indicator 502 is associated. In the example of FIG. 12, the data tag 506 includes an identity header to identify the external entity. As an example, the identity header can correspond to an alpha-numeric code for a wingman, a call-sign, or another identifier for the respective external entity. The data tag 506 also includes distance from the aircraft vehicle and altitude of the external entity. For example, the cursory information of the data tag 506 can provide sufficient information for the pilot to ascertain limited information of the external entity at a glance.

In response to pilot inputs provided at one of the control inceptor(s) (e.g., the first control inceptor 156), the pilot can toggle through the visual indicators that are displayed on the SA video screen 152 to expand the information that is displayed by the respective data tags. As an example, the pilot can expand one of the data tags, all of the data tags of one type of external entity (e.g., allied versus adversarial), and/or expand all of the data tags displayed on the SA video screen 152. For example, the pilot can provide a touch input of one of the visual indicators of an external entity that is displayed on the SA video data provided on the first control inceptor 156 to expand the data tag of the corresponding visual indicator of the respective external entity that is displayed on the SA video screen 152.

The second visual indicator 504 can correspond to a visual indicator, such as the visual indicator 502, that has been expanded, as displayed on the SA video screen 152, to display more detail in the respective data tag 508. Therefore, as an example, the respective data tag 508 can include more detailed information regarding the external entity to which the visual indicator 504 is associated based on the external entity SA data. In the example of FIG. 12, the data tag 508 includes the same information as that displayed in the data tag 506 (e.g., identity header, distance, and altitude). Additionally, the data tag 508 includes additional details regarding the external entity. In the example of FIG. 12, the additional information includes remaining ordnance, fuel reserves, and/or status conditions (e.g., damaged, requesting assistance, exiting the theater of operation, etc.). For example, for the second visual indicator 504 corresponding to an adversarial external entity (e.g., the sixth vehicle 22), the adversarial external entity can be tracked from an initial state (e.g., from takeoff, from entering the theater of operation, etc.) by an allied vehicle (e.g., the third, fourth, or fifth vehicles). Therefore, the allied vehicle can account for ordnance and/or fuel usage of the adversarial aircraft, such that the ordnance and/or fuel usage can be included in the aggregate SA data that is transmitted to the aircraft vehicle. As a result, the more detailed information of the data tag 508 can provide sufficient information for the pilot to ascertain additional information of the external entity, such as to evaluate a threat condition of an adversarial aircraft, provide assistance, or any other decision-based actions.

Such information can be provided for both allied external entities and for adversarial external entities. For example, based on identification of the type of external entity, along with known characteristics of the type of external entity and witnessed or exhibited operation of the adversarial external entity, the data tag 508 can be updated to provide such information to the pilot (e.g., based on the aggregate SA data provided from the ancillary control station 56). Accordingly, as an example, the pilot can make a better assessment of a threat if the data tag 508 indicates that the adversarial aircraft has run out of missiles, or is crashing or leaving the theater of operation, etc.

In view of the foregoing structural and functional features described above, an example method will be better appreciated with reference to FIGS. 7 and 8. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an integrated circuit, processor, or a controller, for example.

Figure 13:
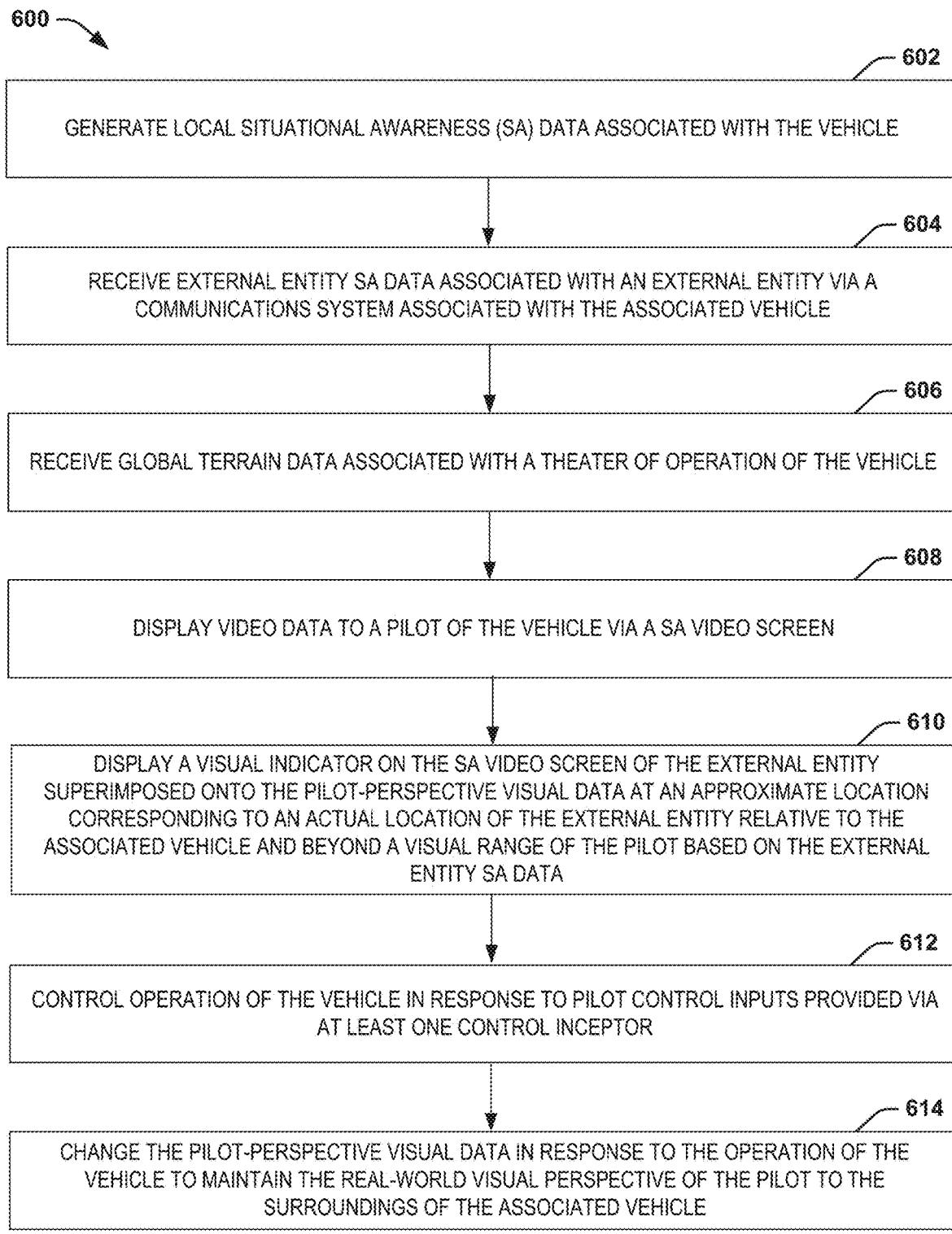
FIG. 13 illustrates an example of a method for controlling an aircraft via a vehicle control system.

FIG. 13 illustrates an example of a method 600 for controlling a vehicle (e.g., the vehicle 52) via a vehicle control system (e.g., the vehicle control system 100). At 602, local SA data associated with the vehicle is generated (e.g., the local SA data sensors 60). At 604, external entity SA data associated with an external entity (e.g., the friendly vehicle(s) 54) is received via a communications system (e.g., the communications system 62) associated with the associated vehicle. At 606, global terrain data associated with a theater of operation of the vehicle is received. At 608, video data is displayed to a pilot of the vehicle via a SA video screen (e.g., the SA video screen 102). The video data can include pilot-perspective visual data corresponding to a real-time dynamic virtual representation of surroundings of the associated vehicle that simulates a real-world visual perspective of the pilot to the surroundings of the associated vehicle based on at least one of the global terrain data and exterior visual data provided from at least one local situational awareness sensor mounted to the vehicle.

At 610, a visual indicator (e.g., the visual indicator(s) 356 and 358) is displayed on the SA video screen of the external entity superimposed onto the pilot-perspective visual data at an approximate location corresponding to an actual location of the external entity relative to the associated vehicle and beyond a visual range of the pilot based on the external entity SA data. At 612, operation of the vehicle is controlled in response to pilot control inputs provided via at least one control inceptor (e.g., the control inceptor(s) 104). At 614, the pilot-perspective visual data is changed in response to the operation of the vehicle to maintain the real-world visual perspective of the pilot to the surroundings of the associated vehicle.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A vehicle control system for a windowless vehicle cockpit, the vehicle control system comprising:
at least one control inceptor configured to provide pilot control of an associated vehicle; a communications interface configured to process external entity situational awareness (SA) data associated with an external entity that is received at a communications system associated with the associated vehicle;
an SA video screen configured to display video data to a pilot of the associated vehicle, the video data comprising pilot-perspective visual data corresponding to a real-time dynamic virtual representation of surroundings of the associated vehicle that simulates a real-world visual perspective of the pilot to the surroundings of the associated vehicle and is responsive to the pilot control, and further comprising a visual indicator of the external entity superimposed onto the pilot-perspective visual data at an approximate location corresponding to an actual location of the external entity relative to the associated vehicle and beyond a visual range of the pilot based on the external entity SA data; and
control station mechanical linkage configured to facilitate physical separation of the windowless vehicle cockpit from the associated vehicle.

2. The system of claim 1, wherein the SA video screen is non-planar to provide the pilot-perspective visual data at multiple directional viewing perspectives with respect to the associated vehicle, the multiple directional viewing perspectives comprising port and starboard viewing perspectives.

3. The system of claim 1, wherein the visual indicator of the external entity comprises an external entity data tag comprising visual status data associated with the external entity, the visual status data comprising distance of the external entity relative to the associated vehicle.

4. The system of claim 3, wherein the video data comprises a plurality of visual indicators of a respective plurality of external entities each superimposed onto the pilot-perspective visual data at respective approximate locations corresponding to respective actual locations of the respective external entities relative to the associated vehicle and beyond a visual range of the pilot based on the external entity SA data, the at least one control inceptor being configured to facilitate toggling between the plurality of visual indicators to expand the external entity data tag of a selected one of the plurality of visual indicators to display a greater amount of SA data of the respective one of the plurality of external entities associated with the selected one of the plurality of visual indicators relative to a remaining at least one of the plurality of visual indicators.

5. The system of claim 1, wherein the communications interface is further configured to provide a piloting simulation to the pilot, wherein the piloting simulation comprises simulated video data that is provided on the SA video screen which is responsive to the pilot control that is simulated for the associated vehicle via the at least one control inceptor.

6. The system of claim 5, wherein the at least one control inceptor comprises an auto-pilot feature to provide autonomous control of the associated vehicle, wherein the communications interface is configured to provide the piloting simulation during the autonomous control of the associated vehicle.

7. The system of claim 1, wherein the communications interface is configured to facilitate pilot control of another vehicle, such that the at least one control inceptor is configured to provide the pilot control of the other vehicle and the SA video screen is configured to display another vehicle video data to the pilot of the associated vehicle, the other vehicle video data comprising pilot-perspective visual data corresponding to a real-time dynamic virtual representation of surroundings of the other vehicle that simulates a real-world visual perspective of the pilot to the surroundings of the other vehicle.

8. The system of claim 1, wherein the communications interface is configured to receive global terrain data, wherein the SA video screen is configured to display the video data comprising the pilot-perspective visual data corresponding to the real-time dynamic virtual representation of surroundings of the associated vehicle that simulates the real-world visual perspective of the pilot to the surroundings of the associated vehicle based on at least one of the global terrain data and exterior visual data provided from at least one local situational awareness sensor mounted to the associated vehicle.

9. The system of claim 1, wherein the communications interface is configured to process adversary SA data associated with an adversarial external entity that is received at the communications system and obtained from at least one sensor associated with an allied external entity, wherein the video data further comprises a visual indicator of the adversarial external entity superimposed onto the pilot-perspective visual data at an approximate location corresponding to an actual location of the adversarial external entity relative to the associated vehicle and beyond a visual range of the pilot based on the adversarial external entity SA data.

10. The system of claim 9, wherein the visual indicator of the adversarial external entity comprises an adversarial external entity data tag comprising visual status data associated with the adversarial external entity, the visual status data comprising distance of the adversarial external entity relative to the associated vehicle.

11. The system of claim 10, wherein the visual status data associated with the adversarial external entity further comprises at least one of fuel usage and ordnance usage associated with the adversarial external entity.

12. The system of claim 1, wherein the SA video screen is configured to display the pilot-perspective visual data in at least one of a simulated weather condition and a simulated time-of-day condition to the pilot regardless of real-time weather and real-time time-of-day.

13. The system of claim 1, wherein the pilot-perspective visual data further comprises weather features and associated SA data tags associated with the weather features, wherein the at least one control inceptor is configured to facilitate pilot inputs to selectively or collectively toggle each of the weather features between a displayed state and a non-displayed state with respect to the pilot-perspective visual data.

14. The system of claim 1, wherein the at least one control inceptor comprises a touch-screen control interface configured to display adjustable geographic map data comprising a global visual indicator of the associated vehicle superimposed on the adjustable geographic map data based on global navigation satellite system data, and further comprising a global visual indicator of the external entity superimposed on the adjustable geographic map data based on the external entity SA data.

15. The system of claim 14, wherein the touch screen control interface is further configured to facilitate pilot inputs to interact with the video data on the SA video screen.

16. The system of claim 14, wherein the at least one control inceptor comprises an articulating bracket to couple the at least one control inceptor to an associated cockpit, the articulating bracket being configured to switch the at least one control inceptor between an upright position and an approximately horizontal table position.

17. The system of claim 1, wherein the at least one control inceptor comprises at least one touch screen vehicle interface to facilitate pilot inputs to interact with the vehicle operating components of the associated vehicle.

18. The system of claim 1, wherein the windowless vehicle cockpit is configured to eject from the associated vehicle in response to an emergency ejection command from the at least one control inceptor.

19. The system of claim 1, wherein the control station mechanical linkage is configured to facilitate physical mechanical coupling of the windowless vehicle cockpit to one of a different vehicle, a simulator cradle, and a remote vehicle control cradle.

20. A method for controlling a vehicle including a windowless vehicle cockpit via a vehicle control system, the method comprising:
generating local situational awareness (SA) data associated with the vehicle;
receiving external entity SA data associated with an external entity via a communications system associated with the associated vehicle;
receiving global terrain data associated with a theater of operation of the vehicle;
displaying video data to a pilot of the vehicle via a SA video screen, the video data comprising pilot-perspective visual data corresponding to a real-time dynamic virtual representation of surroundings of the associated vehicle that simulates a real-world visual perspective of the pilot to the surroundings of the associated vehicle based on at least one of the global terrain data and exterior visual data provided from at least one local situational awareness sensor mounted to the vehicle;
displaying a visual indicator on the SA video screen of the external entity superimposed onto the pilot-perspective visual data at an approximate location corresponding to an actual location of the external entity relative to the associated vehicle and beyond a visual range of the pilot based on the external entity SA data;
controlling operation of the vehicle in response to pilot control inputs provided via at least one control inceptor;
changing the pilot-perspective visual data in response to the operation of the vehicle to maintain the real-world visual perspective of the pilot to the surroundings of the associated vehicle; and
physically disconnecting the windowless vehicle cockpit from the vehicle via a control station mechanical linkage.

21. The method of claim 20, wherein displaying video data comprises displaying the video data via a non-planar SA video screen to provide the pilot-perspective visual data at multiple directional viewing perspectives with respect to the associated vehicle, the multiple directional viewing perspectives comprising port and starboard viewing perspectives.

22. The method of claim 20, wherein displaying the visual indicator comprises displaying an external entity data tag comprising visual status data associated with the external entity, the visual status data comprising distance of the external entity relative to the associated vehicle.

23. The method of claim 20, further comprising:
initiating a piloting simulation comprising simulated video data that is displayed on the SA video screen;
initiating simulated motion of the vehicle in response to the pilot control that is simulated for the vehicle via the at least one control inceptor; and
changing the simulated video data in response to the simulated motion of the vehicle.

24. The method of claim 20, further comprising:
switching control of the at least one control inceptor from the vehicle to another vehicle; displaying video data to the pilot of the other vehicle via the SA video screen, the video data comprising pilot-perspective visual data corresponding to a real-time dynamic virtual representation of surroundings of the other vehicle that simulates a real-world visual perspective of the pilot to the surroundings of the other vehicle based on at least one of the global terrain data and exterior visual data provided from at least one local situational awareness sensor mounted to the other vehicle;
controlling operation of the other vehicle in response to the pilot control inputs provided via the at least one control inceptor; and
changing the pilot-perspective visual data in response to operation of the other vehicle to maintain the real-world visual perspective of the pilot to the surroundings of the other vehicle.

25. The method of claim 20, further comprising:
receiving adversary SA data associated with an adversarial external entity at the communications system from at least one allied external entity;
displaying a visual indicator of the adversarial external entity superimposed onto the pilot-perspective visual data at an approximate location corresponding to an actual location of the adversarial external entity relative to the associated vehicle and beyond a visual range of the pilot based on the adversarial external entity SA data.

26. The method of claim 20, further comprising:
physically connecting the windowless vehicle cockpit to one of a different vehicle, a simulator cradle, and a remote vehicle control cradle.

27. A system comprising:
a first vehicle comprising a control station configured to transmit theater of operation situational awareness (SA) data;
a second vehicle configured to transmit first SA data associated with the second vehicle to the control station and to receive the theater of operational SA data;
a third vehicle comprising a vehicle control system for a windowless vehicle cockpit, the vehicle control system comprising:
at least one control inceptor configured to provide pilot control of the third vehicle;
a communications interface configured to receive and process the theater of operation SA data;
an SA video screen configured to display video data to a pilot of the third vehicle, the video data comprising pilot-perspective visual data corresponding to a real-time dynamic virtual representation of surroundings of the third vehicle that simulates a real-world visual perspective of the pilot to the surroundings of the third vehicle and is responsive to the pilot control, and further comprising a visual indicator of each of the first vehicle and the second vehicle superimposed onto the pilot-perspective visual data at an approximate location corresponding to an actual locations of the first vehicle and the second vehicle, respectively, relative to the third vehicle and beyond a visual range of the pilot based on the theater of operation SA data; and control station mechanical linkage configured to facilitate physical separation of the windowless vehicle cockpit from the third vehicle.

28. The system of claim 27, wherein the visual indicator of each of the first vehicle and the second vehicle comprises an external entity data tag comprising visual status data associated with the first vehicle and the second vehicle, respectively, the visual status data comprising distance of the respective one of the first vehicle and the second relative to the third vehicle.

29. The system of claim 27, wherein the theater of operation SA data comprises global terrain data, wherein the SA video screen is configured to display the video data comprising the pilot-perspective visual data corresponding to a real-time dynamic virtual representation of surroundings of the associated vehicle that simulates the real-world visual perspective of the pilot to the surroundings of the associated vehicle based at least in part on the global terrain data.

30. The system of claim 27, wherein the theater of operation SA data comprises adversary SA data associated with an adversarial external entity, wherein the video data further comprises a visual indicator of the adversarial external entity superimposed onto the pilot-perspective visual data at an approximate location corresponding to an actual location of the adversarial external entity relative to the third vehicle and beyond a visual range of the pilot based on the adversarial external entity SA data.

31. The system of claim 30, wherein the visual indicator of the adversarial external entity comprises an adversarial external entity data tag comprising visual status data associated with the adversarial external entity, the visual status data comprising distance of the adversarial external entity relative to the third vehicle.

\* \* \* \* \*